United States Patent
Weise

(10) Patent No.: US 7,143,036 B2
(45) Date of Patent: *Nov. 28, 2006

(54) RANKING PARSER FOR A NATURAL LANGUAGE PROCESSING SYSTEM

(75) Inventor: David N. Weise, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 141 days.

This patent is subject to a terminal disclaimer.

(21) Appl. No.: 10/929,167

(22) Filed: Aug. 30, 2004

(65) Prior Publication Data

US 2005/0027512 A1    Feb. 3, 2005

Related U.S. Application Data

(63) Continuation of application No. 09/620,745, filed on Jul. 20, 2000.

(51) Int. Cl.
G10L 15/00      (2006.01)

(52) U.S. Cl. .................................. 704/245; 704/257

(58) Field of Classification Search .................. 704/9, 704/10, 257, 245
See application file for complete search history.

(56) References Cited

U.S. PATENT DOCUMENTS 4,868,750 A      9/1989  Kucera et al.
4,931,928 A      6/1990  Greenfeld
5,148,406 A      9/1992  Church
5,317,647 A      5/1994  Pagallo
5,418,717 A      5/1995  Su et al.
5,966,686 A  *  10/1999  Heidorn et al. ............... 704/9
6,278,987 B1     8/2001  Akers et al.

* cited by examiner

Primary Examiner—Daniel Abebe
(74) Attorney, Agent, or Firm—Lee & Hayes, PLLC

(57) ABSTRACT

A natural language parse ranker of a natural language processing (NLP) system employs a goodness function to rank the possible grammatically valid parses of an utterance. The goodness function generates a statistical goodness measure (SGM) for each valid parse. The parse ranker orders the parses based upon their SGM values. It presents the parse with the greatest SGM value as the one that most likely represents the intended meaning of the speaker. The goodness function of this parse ranker is highly accurate in representing the intended meaning of a speaker. It also has reasonable training data requirements. With this parse ranker, the SGM of a particular parse is the combination of all of the probabilities of each node within the parse tree of such parse. The probability at a given node is the probability of taking a transition ("grammar rule") at that point. The probability at a node is conditioned on highly predicative linguistic phenomena, such as "phrase levels," "null transitions," and "syntactic history".

25 Claims, 10 Drawing Sheets

(background)

(background)

(background)

(background)

(background)

Parse Tree 90

Parse Tree 92

Parse Tree 94

Parse Tree 96

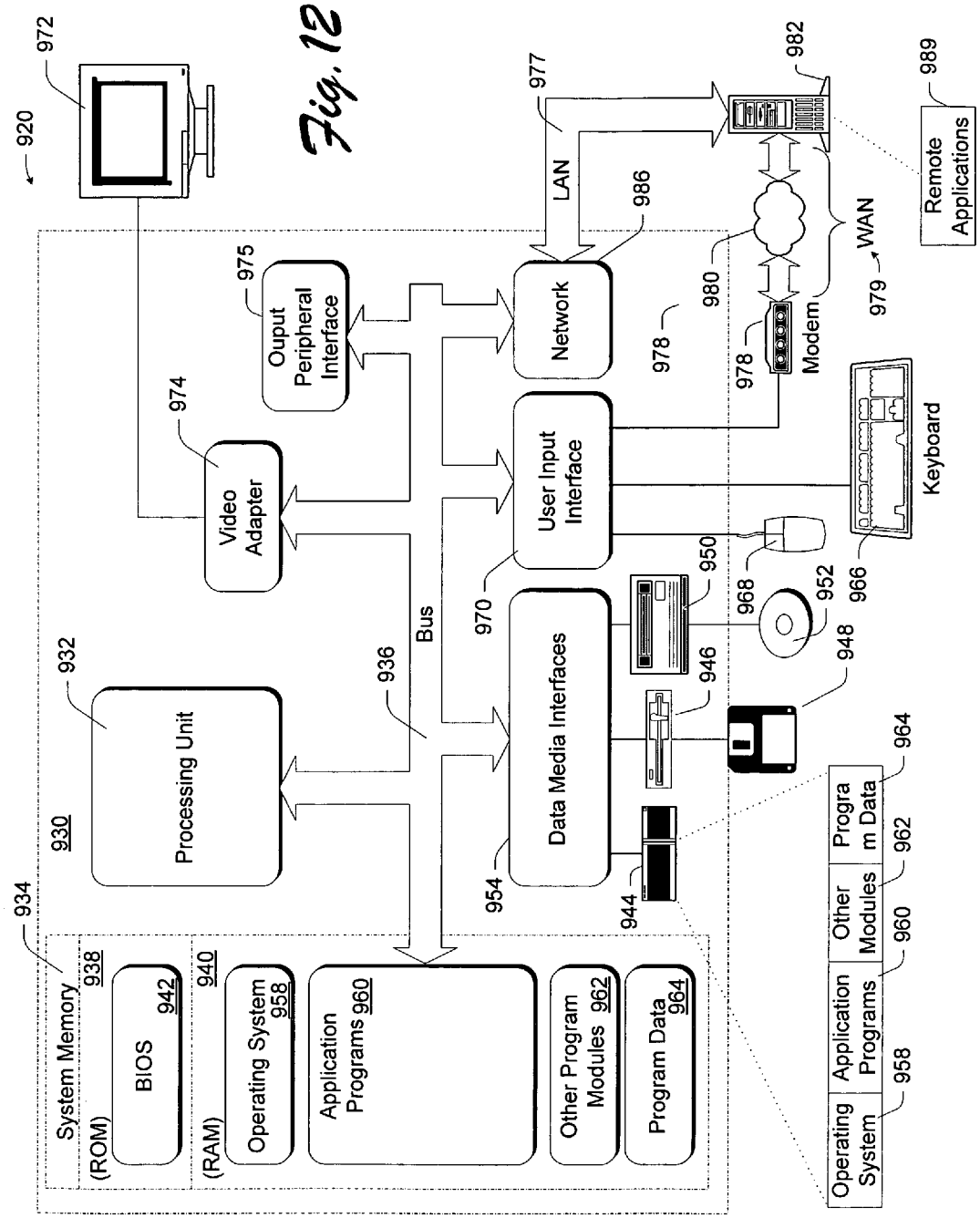

RANKING PARSER FOR A NATURAL LANGUAGE PROCESSING SYSTEM

RELATED APPLICATIONS

This application is a continuation of and claims priority to U.S. patent application Ser. No. 09/620,745, filed Jul. 20, 2000, the disclosure of which is incorporated by reference herein.

TECHNICAL FIELD

This invention relates to ranking parses produced by a parser for a natural language processing system.

BACKGROUND

In general, a computer is a digital machine that uses precise languages with absolute values, such as "on", "off", "1", "0", "3+4", "AND", and "XOR". In contrast, a human is an analog, biological machine that inherently uses imprecise languages with few or no absolute values. Since computers are tools for human use, input devices and input processing system are needed for humans to use the computer tools.

Since it is generally easier to train humans to conform to the digital requirements of computers than vice versa, humans have used precise input interfaces such as a keyboard and a mouse. In addition, the computer is often only required to receive the input and not to process it for syntax and semantics.

In the past, this has been the situation because of limited processing capabilities of typical computers and because of the inherent difficulties of modeling imprecise human language within a digital computer. However, as typical computing power increases, natural language processing systems are being used by computers to "understand" imprecise human language.

Natural Language Processing

A natural language processing (NLP) system is typically a computer-implemented software system, which intelligently derives meaning and context from an input string of natural language text. "Natural languages" are the imprecise languages that are spoken by humans (e.g., English, French, Japanese). Without specialized assistance, computers cannot distinguish linguistic characteristics of natural language text. For instance, a sentence in a natural language text read as follows:

Betty saw a bird.

A student of English understands that, within the context of this sentence, the word "Betty" is a noun, the word "saw" is a verb, the word "a" is an adjective, and the word "bird" is a noun. However, in the context of other sentences, the same words might assume different parts of speech. Consider the following sentence:

Use a saw.

The English student recognizes that the word "use" is a verb, the word "a" is an adjective, and the word "saw" is a noun. Notice that the word "saw" is used in the two sentences as different parts of speech—a verb and a noun— which an English speaking person realizes. To a computer, however, the word "saw" is represented by the same bit stream and hence can be identical for both sentences. The computer is equally likely to consider the word "saw" as a noun as it is a verb, in either sentence.

A NLP system assists the computer in distinguishing how words are used in different contexts and in applying rules to construct syntactical and meaning representations. A NLP system has many different applications where a computer derives meaning and information from the natural language of a human. Such applications include speech recognition, handwriting recognition, grammar checking, spell checking, formulating database searches, and language translation.

The core of a NLP system is its parser. Generally, a parser breaks an utterance (such as a phrase or sentence) down into its component parts with an explanation of the form, function, and syntactical relationship of each part.

NLP Parser

The NLP parser takes a phrase and builds for the computer a representation of the syntax of the phrase that the computer can understand. A parser may produce multiple different representations for a given phrase. The representation makes explicit the role each word plays and the relationships between the words, much in the same way as grade school children diagram sentences. In addition to "diagramming" a sentence, the parser ranks the multiple diagrams in order of most likely meaning to least likely.

Herein, an utterance is equivalent to a phrase. A phase is a sequence of words intended to have meaning. In addition, a sentence is understood to be one or more phrases. In addition, references herein to a human speaker include a writer and speech includes writing.

FIG. 1 shows a NLP parser 20 of a typical NLP system. The parser 20 has four key components:

Tokenizer 28;
Grammar Rules Interpreter 26;
Searcher 30; and
Parse Ranker 34.

The parser 20 receives a textual string 22. Typically, this is a sentence or a phrase. The parser also receives grammar rules 24. These rules attempt to codify and interpret the actual grammar rules of a particular natural language, such as English. Alternatively, these rules may be stored in memory within the parser.

The grammar rules interpreter 26 interprets the codified grammar rules. The tokenizer 28 identifies the words in the textual string 22, looks them up in a dictionary, makes records for the parts of speech (POS) of a word, and passes these to the searcher.

The searcher 30 in cooperation with the grammar rules interpreter generates multiple grammatically correct parses of the textual string. The searcher sends its results to the parse ranker 34.

The parse ranker 34 mathematically measures the "goodness" of each parse and ranks them. "Goodness" is a measure of the likelihood that such a parse represents the intended meaning of the human speaker (or writer). The ranked output of the parser ranker is the output of the ranker. This output is one or more of parses 38 ranked from most to least goodness.

Foundational Concepts

Three concepts form the foundation for understanding the invention described herein: statistics, linguistics, and computational linguistics.

Statistics is the branch of mathematics that deals with the relationships among and between groups of measurements, and with the relevance of similarities and differences in those relationships.

Linguistics is the analytic study of human natural language.

Computational linguistics is the analytic study of human natural language within computer science to mathematically represent language rules such as grammar, syntax, and semantics.

Statistics

Probability. The expression "Prob(x)" is the probability of event x occurring. The result of Prob(x) is a number between zero (0) and one (1), where zero means that the event never occurs and one means that it always occurs. For example, using a six-sided fair die with the sides labeled 1–6, the probability of rolling a three is 1/6. Similarly, using a randomly shuffled deck of cards (All examples using a deck of cards are based upon a standard American deck of cards having four suits (spades, hearts, diamonds, clubs) and thirteen cards per suit:

Prob(top card is an Ace)=1/13

Prob(top card is a club)=1/4

Prob(top card is 3 of diamonds)=1/52

Estimating Probabilities using Training Data. The probability of events using a randomly shuffled deck or fair die can be mathematically derived. However, in many cases, there is no mathematical formula for a probability of a given event. For example, assume that one wished to determine the probability of rolling a three given a weighted die. The probability may be 1/6 (as it would be with a fair die), but it is likely to be more or less than that depending upon how the die is weighted.

How would one estimate the probability? The answer is to run an experiment. The die is thrown many times and the number of rolls where "3" is rolled is counted. This data is called the "training data". It is sometimes called the "training corpus." To determine the probability of rolling a three in the future, it is assumed that the behavior of the die in the future will be the same as it was during our experiment and thus:

$$Prob(\text{event}) = \frac{\text{Count(event)}}{\text{Total number of events}}$$

$$Prob(\text{roll is a 3}) = \frac{\text{Count(number of 3 rolls in the experiment)}}{\text{Total \# of rolls in the experiment}}$$

In general, the accuracy of the estimate increases as the amount of training data increases. Theoretically, the estimates increase in accuracy as the amount of training data increases.

Conditional Probability. Conditional probabilities are used when there is additional information known about an event that affects the likelihood of the outcome. The notation used is Prob(x|y) meaning, "What is the probability of an unknown event x occurring given that known event y occurred."

Conditional probability is defined to be:

$$Prob(x \mid y) = \frac{Prob(x \ \& \ y)}{Prob(y)}$$

$$= \frac{\frac{\text{Count}(x \ \& \ y)}{\text{Total \# of events}}}{\frac{\text{Count}(y)}{\text{Total \# of events}}}$$

$$= \frac{\text{Count}(x \ \& \ y)}{\text{Count}(y)}$$

When the known event is predicative of the outcome, knowing the conditional probabilities is better than knowing just the unconditional probability. For example, assume that a man is in a casino playing the following game. The man then can bet $1 or pass. The House rolls a pair of dice. If the man bets and if the dice sum to 12, the man gets $35, otherwise the man loses his bet. Since the probability of rolling two die that sum to 12 is 1/36, the man should expect to lose money playing this game. On average, the man will make only $35 for every $36 that he bets.

Now suppose that the man had a fairy godmother that could whisper in his ear and tell him whether one of the die rolled was going to be a six. Knowing this, the probabilities of rolling a twelve are:

Prob(two die summing to 12|one die is a 6)=1/6

Prob(two die summing to 12|neither die is a 6)=0

With the fairy godmother's help, the man can make money on the game. The strategy is to only bet when the fairy godmother says that one of the die is a six. On average, the man should expect to make $35 for every $6 that he bets.

As another example, consider the problem of predicting what the next word in a stream of text will be. E.g., is the next word after "home" more likely to be "table" or "run."? $Word_i$ represents the $i^{th}$ word in the lexicon and $Prob(word_i)$ is the probability that $word_i$ will be the next word in the stream. The standard approach (using unconditional probability) for computing $Prob(word_i)$ is to take a training corpus and count up the number of times the word appears. This formula represents this approach:

$$Prob(word_i) = \frac{\text{Count}(word_i)}{\text{Total \# of words in the training corpus}}$$

Better results are achieved by using conditional probabilities. In English, words don't appear in a random order. For example, "Table red the is" is highly unlikely but "The table is red" is common. Put another way, the last word in a stream is predicative of the next word that will follow. For example, if the last word in a stream is "the" or "a", then the next word is usually either an adjective or noun, but is rarely a verb. If the last word in a stream is "clever", then the next word is likely to be an animate noun like "boy" or "dog" and not likely to be an inanimate noun like "stone."

By making use of this information, the next word that will appear in a stream of text may be better predicted. If every pair of words in our lexicon is considered and a record of how often that pairs appear is kept, the probability of a specific word pairing is:

$$\frac{Prob(word_i \mid word_k}{\text{appears before } word_i)} = \frac{\text{Count }(word_i \text{ and } (word_k \text{ before } word_i))}{\text{Count }(word_k)}$$

This conditional probability is much more accurate than $Prob(word_i)$. This technique is commonly used by conventionally speech recognizers to predict what words are likely to follow a given speech fragment.

Sparse Data Problem. The sparse data problem occurs when there is not enough data in a training corpus to distinguish between events that never occur versus events that are possible but just didn't happen to occur in the training corpus. For example, $Prob(word_i+1|word_i)$ is being computed by counting how often pairs of words occur in the corpus. If in the training corpus the pair of words "gigantic"

and "car" never appears, it would be wrong to conclude that it is impossible in the English language to have the words "gigantic" and "car" together.

In general, natural languages have nearly an infinite number of possible word, phrase, and sentence combinations. The training corpus used to determine conditional probabilities must necessarily be a subset of this set of infinite combinations. Thus, the sparse data problem results in poor probabilities with a given combination when the training corpus did not include that given combination.

Chain Rule.

$$Prob(a, b|c) = Prob(a|c) \, Prob(b|a, c)$$

Linguistics

Linguistics is the scientific study of language. It endeavors to answer the question—what is language and how it is represented in the mind? Linguistics focuses on describing and explaining language.

Linguistics focuses on languages' syntax (sentence and phrase structures), morphology (word formation), and semantics (meaning). Before a computer representation model of a natural language can be generated and effectively used, the natural language must be analyzed. This is the role of linguistics.

Part of Speech. Linguists group words of a language into classes, which show similar syntactic behavior, and often a typical semantic type. These word classes are otherwise called "syntactic" or "grammatical categories", but more commonly still by the traditional names "part of speech" (POS). For example, common POS categories for English include noun, verb, adjective, preposition, and adverb Word Order and Phrases. Words do not occur in just any order. Languages have constraints on the word order. Generally, words are organized into phrases, which are groupings of words that are clumped as a unit. Syntax is the study of the regularities and constraints of word order and phrase structure. Among the major phrase types are noun phrases, verb phrases, prepositional phrases, and adjective phrases.

Headword. The headword is the key word in a phrase. This is because it determines the syntactic character of a phrase. In a noun phrase, the headword is the noun. In a verb phrase, it is the main verb. For example, in the noun phrase "red book", the headword is "book." Similarly, for the verb phrase "going to the big store", the headword is "going."

Modifying Headword. A modifying headword is the headword of a sub-phrase within a phrase where the sub-phrase modifies the main headword of the main phrase. Assume a phrase (P) has a headword (hwP) and a modifying sub-phrase (M) within the P that modifies hwP. The modifying headword (hwM) is the headword of this modify sub-phrase (M).

For example, if the phrase is "The red bear growled at me", the headword is "growled," the modifying phrase is "the red bear," and the modifying headword is "bear." If the phrase is "running to the store", then the headword is "running", the is modifying phrase is "to the store", and the modifying headword is "to."

Lemma of Headwords. The syntactic and semantic behavior of a headword is often independent of its inflectional morphology. For example, the verbs "walks", "walking", and "walked" are derived from the verb "walk". The transitivity of a verb is independent of such inflection.

Syntactic Features. Syntactic features are distinctive properties of a word relating to how the word is used syntactically. For example, the syntactic features of a noun include whether it is singular (e.g. cat) or plural (e.g. cats) and whether it is countable (e.g. five forks) or uncountable (e.g. air). The syntactic feature of a verb includes whether or not it takes an object:

Intransitive verbs do not take an object. For example, "John laughed," and "Bill walked,"

Mono-transitive verbs take a single direct object. For example, "I hit the ball", Di-transitive verbs takes a direct and an indirect object. For example, "I gave Bill the ball," and "I promised Bill the money"

Computational Linguistics

Transitions (i.e., Rewrite Rules). The regularities of a natural language's word order and grammar are often captured by a set of rules called "transitions" or "rewrite rules." The rewrite rules are a computer representation of rules of grammar. These transitions are used to parse a phrase.

A rewrite rule has the notation form: "symbolA→symbolB symbolC . . . ". This indicates that symbol (symbolA) on the left side of the rule may be rewritten as one or more symbols (symbolB, symbolC, etc.) on the right side of the rule.

For example, symbolA may be "s" to indicate the "start" of the sentence analysis. SymbolB may be "np" for noun phrase and symbolC may be "vp" for verb phrase. The "np" and "vp" symbols may be further broken down until the actual words in the sentence are represented by symbolB, symbolC, etc.

For convenience, transitions can be named so that the entire rule need not be recited each time a particular transition is referenced. In Table 1 below the name of the transitions are provided under the "Name" heading. The actual transitions are provided under the "Transition" heading. Table 1 provides an example of transitions being used to parse a sentence like "Swat flies like ants":

TABLE 1

| Name | Transition (i.e., rewrite rule) |
| --- | --- |
| s_npvp | s → np vp |
| s_vp | s → vp |
| np_noun | np → noun |
| np_nounpp | np → noun pp |
| np_nounnp | np → noun np |
| vp_verb | vp → verb |
| vp_verbnp | vp → verb np |
| vp_verbpp | vp → verb pp |
| vp_verbnppp | vp → verb np pp |
| pp_prepnp | pp → prep np |
| prep_like | prep → like |
| verb_swat | verb → swat |
| verb_flies | verb → flies |
| verb_like | verb → like |
| noun_swat | noun → swat |
| noun_flies | noun → flies |
| noun_ants | noun → ants |

In Table 1 above, the transition names (on the left-hand column) represent and identify the transition rule (on the right-hand column). For example, "np_nounpp" is the name for "np→noun pp" rule, which means that "noun phrase" may be rewritten as "noun" and "prepositional phrase."

Context Free Grammar (CFG). The nature of the rewrite rules is that a certain syntactic category (e.g, noun, np, vp, pp) can be rewritten as one or more other syntactic categories or words. The possibilities for rewriting depend solely on the category, and not on any surrounding context, so such phrase structure grammars are commonly referred to as context-free grammars (CFG).

FIG. 2 illustrates a CFG parse tree 50 of a phrase (or sentence). This tree-like representation of the sentence "flies like ants" is deconstructed using a CFG set of rewrite rules (i.e, transitions). The tree 50 has leaf nodes (such as 52a–52c and 54a–54g.)

The tree 50 includes a set of terminal nodes 52a–52c. These nodes are at the end of each branch of the tree and cannot be further expanded. For example, "like" 52b cannot be expanded any further because it is the word itself.

The tree 50 also includes a set of non-terminal nodes 54a–54g. These nodes are internal and may be further expanded. Each non-terminal node has immediate children, which form a branch (i.e., "local tree"). Each branch corresponds to the application of a transition. For example, "np" 54b can be further expanded into a "noun" by application of the "np_noun" transition.

Each non-terminal node in the parse tree is created via the application of some rewrite rule. For example, in FIG. 2, the root node 54a was created by the "s→np vp" rule. The "VP" node 54d by the "s→verb np" rule.

The tree 50 has a non-terminal node 54a designated as the starting node and it is labeled "s."

In general, the order of the children in each branch generates the word order of the sentence, and the tree has a single root node (in FIG. 2 it is node 54a), which is the start of the parse tree.

Segtypes. A non-terminal node has a type that is called its "segtype." In FIG. 2, each non-terminal node 54a–g is labeled with its segtype. A node's segtype identifies the rule that was used to create the node (working up from the terminal nodes). In Table 1 above, the segtypes are shown under the "Transition" heading and to the left of the "→" symbol. For example, the segtype of node 54b in FIG. 2 is "np" because the rule "np→noun" was used to create the node. In given grammar, a segtype can be many different values including, for example: NOUN, NP (noun phrase), VERB, VP (verb phrase), ADJ (adjective), ADJP (adjective phrase), ADV (adverb), PREP (preposition), PP (prepositional phrase), INFCL (infinitive clauses), PRPRT (present participial clause) PTPRT (past participial clause), RELCL (relative clauses), and AVPVP (a verb phrase that has a verb phrase as its head).

Node-Associated Functional Notation. In this document, a functional notation is used to refer to the information associated with a node. For example, if a variable "n" represents a node in the tree, then "hw(n)" is the headword of node "n."

The following functions are used throughout this document:

hw(n) is the headword of node n segtype(n) is the segtype of node n trans(n) is the transition (rewrite rule) associated with node n (e.g., the rules under the heading "Transition" in Table 1)

trn(n) is the name of the transition (e.g. the names under the heading "Name" in Table 1)

modhw(n) is the modifying headword of node n

Annotated Parse Tree. A parse tree can be annotated with information computed during the parsing process. A common form of this is the lexicalized parse tree where each node is annotated with its headword. One can annotate a parse tree with additional linguistic information (e.g. syntactic features).

FIG. 3 shows an example of such a lexicalized parse tree 60. (For the purposes of this example, directional path 66 with circled reference points is ignored.) FIG. 3 is a parse tree of one of many parses of the sentence, "swat flies like ants." Terminal nodes 62a–d, which are the words of the sentence, are not annotated. Non-terminal nodes 64a–i are annotated. For example, node 64h has a segtype of "noun" and is annotated with "hw=ants". This means that its headword is "ants."

The parse tree 60 in FIG. 3 is also annotated with the names of the transitions between nodes. For example, the transition name "vp_verbvp" is listed between node 64f and node 64h.

Probabilistic Context Free Grammar (PCFG). A PCFG is a context free grammar where every transition is assigned a probability from zero to one. PCFGs have commonly been used to define a parser's "goodness" function. "Goodness" is a calculated measurement of the likelihood that a parse represents the intended meaning of the human speaker. In a PCFG, trees containing transitions that are more probable are preferred over trees that contain less probable transitions.

Since the probability of a transition occurring cannot be mathematically derived, the standard approach is to estimate the probabilities based upon a training corpus. A training corpus is a body of sentences and phrases that are intended to represent "typical" human speech in a natural language. The speech may be intended to be "typical" for general applications, specific applications, and/or customized applications. This "training corpus" may also be called "training data."

Thus, the probabilities are empirically derived from analyzing a training corpus. Various approaches exist for doing this. One of the simplest approaches is to use an unconditional probability formula like this:

$$Prob(event) = \frac{Count(event)}{Total\ number\ of\ events}$$

$$Prob(trans_i) = \frac{Count(times\ trans_i\ appears)}{Total\ \#\ of\ transitions\ in\ the\ training\ corpus}$$

However, this approach, by itself, produces inaccurate results because the likelihood that a transition will apply is highly dependent upon the current linguistic context, but this approach does not consider the current linguistic context. This approach simply considers occurrences of specific transitions ($trans_i$).

Depth First Tree Walk. In order to analyze each node of a parse tree to rank parse trees, a parser must have a method of "visiting" each node. In other words, the nodes are examined in a particular order.

A "depth first tree walk" is a typical method of visiting all the nodes in a parse tree. In such a walk, all of a node's children are visited before any of the node's siblings. The visitation is typically from top of the tree (i.e., the start node) to the bottom of the tree (i.e., terminal nodes). Such visitation is typically done from left-to-right to correspond to the order of reading/writing in English, but may is be done from right-to-left.

The directional path 66 of FIG. 3 shows a depth first tree walk of the parse tree. The sequence of the walk is shown by the directional path 66 with circled reference points. The order of the stops along the path is numbered from 1 to 14 by the circled reference points.

Generative model of syntax. Each sentence-tree pair in a language has an associated top-down derivation consisting of a sequence of rule applications (transitions) of a grammar.

Augmented Phrase Structured Grammar (APSG). An APSG is a CFG that gives multiple names to each rule, thereby limiting the application of each "named" rule. Thus, for each given rewrite rule there are more than one name and the name limits its use to specific and narrower situations. For example, the structure "VP→NP VP" may have these limiting labels: "SubjPQuant" and "VPwNPl."

SubjPQuant specifies subject post-quantifiers on a verb phrase. For example, in "we all found useful the guidelines" is [NP all][VP found useful the guidelines]. "all" is a subject post-qualifier. The structure of "all found useful the guidelines." VPwNP1 specifies a subject to a verb phrase. For example, in "John hit the ball" [NP John] [VP hit the ball] where John is the subject.

An APSG is similar to a CFG in that there are rules that look like CFG rules. But an APSG rule can examine the pieces to decide if it is going to put them together, and it determines and labels the syntactic relation between the children. Because of this, one can have multiple rules that represent VP->NP VP. This multiple rules can build different syntactic relationships.

This is an example of how this model may work: Start at the top node. There is a rule that produces the constituents below. Record this rule. Pick the leftmost of the children. If this node does not have children, then visit its sibling to the right. If there is no sibling go up to the parent and visit the parents right sibling. Keep going up and to the right until an unvisited node is found. If all nodes have been visited then we are done. For any node not visited, record the rule and recurse. (This is much easier to describe using code.) This is what is meant by top-down and left to right. This produces a unique representation of the tree.

The Problem

Given the ambiguity that exists in natural languages, many sentences have multiple syntactic interpretations. The different syntactic interpretations generally have different semantic interpretations. In other words, a sentence has more than one grammatically valid structure ("syntactic interpretation") and as a result, may have more than one reasonable meaning ("semantic interpretation"). A classic example of this is the sentence, "time flies like an arrow." There are generally considered to be seven valid syntactic parse trees.

FIGS. 4a and 4b show examples of two of the seven valid parses of this sentence. For the parse tree 70 of FIG. 4a, the object "time" 74 moves in a way that is similar to an arrow. For the parse tree 80 of FIG. 4b, the insects called "time flies" 84 enjoy the arrow object; just as one would say "Fruit flies like a meal."

Either parse could be what the speaker intended. In addition, five other syntactically valid parses may represent the meaning that the speaker intended.

How does a NLP system determine which parse is the "correct" one. It is better to say the most "correct" one. How does a NLP parser judge amongst the multiple grammatically valid parses and select the most "correct" parse?

Previous Approaches

Generally. A parser needs a way to accurately and efficiently rank these parse trees. In other words, the parser needs to compute which parse tree is the most likely interpretation for a sentence, such as "time flies like an arrow."

Since human language is inherently imprecise, rarely is one parse one hundred percent (100%) correct and the others never correct. Therefore, a parser typically ranks the parses from most likely to be correct to least likely to be correct. Correctness in this situation is a measure of what a human most likely means by a particular utterance.

A conventional approach is to use a "goodness" function to calculate a "goodness measure" of each valid parse. Existing parsers differ in the extent to which they rely on a goodness function, but most parsers utilize one.

A simple parser may generate all possible trees without regard to any linguistic knowledge and then allow the goodness function to do all the work in selecting the desired parse. Alternatively, a parser generates reasonable trees based on linguistic knowledge and then uses the goodness function to choose between the reasonable trees. In either case, the problem is to implement an efficient goodness function that accurately reflects and measures the most likely meaning of an utterance.

Straw Man Approach. The most straightforward approach is the "straw man approach." The goodness function of this approach computes the probability of a given parse tree based upon how often identical trees appeared in a training corpus. This approach is theoretical and is rarely (if ever) used in practice. This is because it is inaccurate without an impractically huge training corpus that accurately represents nearly all-possible syntactic and semantic constructions within a given language.

Using the straw man approach, the probability of a parse tree is defined to be:

$$Prob(\text{parse}) = \frac{\text{Count (parse)}}{\text{Total \# of trees in the training corpus}}$$

For example, assume in the training corpus the sentence, "time flies like an arrow" appears ten times. The parse represented by the parse tree 70 of FIG. 4a appears in nine of those times. In addition, the parse represented by the parse tree 80 of FIG. 4b appears only once. Thus, the probability of the parse tree 70 of FIG. 4a would be ninety percent.

If the parse of parse tree 70 is the correct parse, then this example provide good results. Note that, the exact sentence had to occur multiple times within the corpus to provide such good results.

Theoretically, given enough training data, the straw man approach can be highly accurate. Because, the amount of training data required is astronomical. First, it requires that the tagged training corpus contain all the sentences that the parser is likely to ever encounter. Second, the sentences must appear in the correct ratios corresponding to their appearance within the normal usage of the natural language. In other words, common sentences occurring more often than uncommon sentences and in the right proportion.

Creating such a huge training corpus is infeasible. However, working from a smaller corpus creates sparse data problems.

Statistical Hodgepodge Approach. Using this approach, the goodness of a parse may be determined by a collection of mostly unrelated statistical calculations based upon parts of speech, syntactic features, word probabilities, and selected heuristic rules.

A goodness function using such an approach is utilized by the grammar checker in "Office 97" by the Microsoft Corporation. Parses were assigned a score based upon statistical information and heuristic rules. These scores were often called "POD" scores.

Since this hodgepodge approach employs heuristics and does not use a unifying methodology for calculating the goodness measure of parses, there are unpredictable and unanticipated results that incorrectly rank the parses.

Syntactic Bigrams Approach. This approach uses collocations to compute a goodness function. A collocation is two or more words in some adjacent ordering or syntactic relationship. Examples of such include: "strong tea", "weapons of mass destruction", "make up", "the rich and powerful", "stiff breeze", and "broad daylight."

Specifically, syntactic bigrams are two-word collocation. The basic idea is to find the probability of two words of being in a syntactic relationship to each other, regardless of where those words appear in the sentence. The words may be adjacent (e.g., "I drink coffee."), but need not be (e.g., "I love to drink hot black coffee.") For example, the object of the verb "drink" is more likely to be "coffee" or "beer" than "table". This can be used to create a goodness function based on "syntactic bigrams."

If the following four sentences appeared in the training corpus, all four would provide evidence that "coffee" is often the object of the verb "to drink":

I drink coffee.
I drink black coffee.
I love to drink hot black coffee.
I drink, on most days of the week, coffee in the morning.

However, because of the huge potential number of word combinations, this approach requires a hefty training corpus.

Transition Probability Approach (TPA). A goodness function may be calculated using a generative grammar approach. Each sentence has a top-down derivation consisting of a sequence of rule applications (transitions). The probability of the parse tree is defined to be the product of the probabilities of the transitions.

There are a number of different ways to assign probabilities to the transitions. For this example, the transition probabilities are conditioned on segtype:

Prob(parse)

$$Prob(\text{parse}) = \prod_i Prob(n_i)$$

$$= \prod_i Prob(trans(n_i) \mid segtype(n_i))$$

$$= \prod_i \frac{\text{Count }(trans(n_i) \,\&\, segtype(n_i))}{\text{Count }(segtype(n_i))}$$

Where
  $n_i$: is the $i^{th}$ node
  $trans(n_i)$: is the transition out of $n_i$ of the form X→Y Z
  $segtype(n_i)$: is the segtype of $n_i$
  $\Pi_i$ is the notation to combine (e.g., multiply) over all nodes i in the parse tree For example, suppose that probabilities are assigned to each transition shown in Table 1 above and those probabilities are based upon some training corpus. The training corpus would contain parsed sentences such that the system can count the number of times each transition occurred. In other words, the system counts the number of times each particular grammar rule was used to generate the parse. The result might be:

TABLE 2

| Transition | Count | Prob(trans\|segtype) | |
|---|---|---|---|
| s → np vp | 80 | .8 | Sum = 1.0 |
| s → vp | 20 | .2 | |
| np → noun | 80 | .4 | Sum = 1.0 |
| np → noun pp | 100 | .5 | |
| np → noun np | 20 | .1 | |
| vp → verb | 40 | .4 | Sum = 1.0 |
| vp → verb np | 20 | .2 | |

TABLE 2-continued

| Transition | Count | Prob(trans\|segtype) | |
|---|---|---|---|
| vp → verb pp | 20 | .2 | |
| vp → verb np pp | 20 | .2 | |
| pp → prep np | 10 | 1 | Sum = 1.0 |
| prep → like | 10 | 1 | Sum = 1.0 |
| verb → swat | 10 | .1 | Sum = 1.0 |
| verb → flies | 50 | .5 | |
| verb → like | 40 | .4 | |
| noun → swat | 100 | .5 | Sum = 1.0 |
| noun → flies | 50 | .25 | |
| noun → ants | 50 | .25 | |

Using the PCFG represented by Table 2 above, the probability of a parse tree can be computed below as follows:

$$Prob\ (S) = Prob(s \to np\ vp) * Prob(np \to \text{noun}\ np) *$$

$$Prob(\text{noun} \to wat) * Prob\ (np \to \text{noun}) *$$

$$Prob(\text{noun} \to \text{flies}) * Prob(vp \to \text{verb}\ np) *$$

$$Prob(\text{verb} \to \text{like}) * Prob(np \to \text{noun}) *$$

$$Prob(\text{noun} \to \text{ants})$$

$$= .8 * .4 * .05 * .4 * .4 * .45 * .3 * .4 * .4 * .5$$

$$= 0.000027648$$

However, this approach does not define a very accurate goodness function. Alone, a PCFG is generally poor at ranking parses correctly. A PCFG prefers common constructions in a language over less common ones.

Ancestor Dependency-Based Generative Approach (AD-BGA). This approach assumes a top-down, generative grammar approach. It defines a formulism for computing the probability of a transition given an arbitrary set of linguistic features. Features might include headword, segtype, and grammatical number, though the formulism is independent of the actual features used. This approach does not attempt to define a particular set of features.

A transition is assumed to have the form:

$$(a_1, a_2, \ldots a_g) \to (b_1, b_2, \ldots b_g)(c_1, c_2, \ldots c_g)$$

where
  $a_1, a_2, \ldots a_g$ are the features of a parent node
  $b_1, b_2, \ldots b_g$ are the features of a left child
  $c_1, c_2, \ldots c_g$ are the features of a right child
The probability of a transition is $$Prob(b_1, b_2, \ldots b_g, c_1, c_2, \ldots c_g \mid a_1, a_2, \ldots a_g)$$

Using the chain rule, this approach then conditions each feature on the parent feature and all features earlier in the sequence:

$$Prob(b_1, b_2, \ldots b_g, c_1, c_2, \ldots c_g \mid a_1, a_2, \ldots a_g) = Prob(b_1 \mid a_1, \ldots, a_g) *$$

$$Prob(b_2 \mid a_1, \ldots, a_g, b_1) *$$

$$Prob(b_3 \mid a_1, \ldots, a_g, b_1, b_2) * \ldots *$$

$$Prob(b_g \mid a_1, \ldots, a_g, b_1, \ldots, b_{g-1}) *$$

$$Prob(c_1 \mid a_1, \ldots, a_g, b_1, \ldots, b_g) *$$

$$Prob(c_2 \mid a_1, \ldots, a_g, b_1, \ldots, b_g, c_1) * \ldots *$$

$$Prob(c_g \mid a_1, \ldots, a_g, b_1, \ldots, b_g, c_1, \ldots, c_{g-1})$$

BACKGROUND SUMMARY

It is desirable for a NLP parser to be able to computationally choose the most probable parse from the potentially large number of possible parses. For example, the sentence "Feeding deer prohibited" may be logically interpreted to mean either the act of feeding is prohibited or that a type of deer is prohibited.

A parser typically uses a goodness function to generate a "goodness measure" that ranks the parse trees. Conventional implementations use heuristic ("rule of thumb") rules and/or statistics based on the part of speech of the words in the sentence and immediate syntactic context.

The goodness function is a key component to a NLP parser. By improving the goodness function, the parser improves its accuracy. In particular, the goodness function enables the parser to choose the best parse for an utterance. Each parse may be viewed as a tree with branches that eventually branch to each word in a sentence.

Existing NLP parsers rank each parse tree using conventional goodness measures. To determine the parse with the highest probability of being correct (i.e., the highest goodness measure), each branch of each parse tree is given a probability. These probabilities are generated based upon a large database of correctly parsed sentences (i.e., "training corpus"). The goodness measure of each parse tree is then calculated by combining assigned probabilities of each branch in a parse tree. This conventional statistical goodness approach is typically done with little or no consideration for contextual words and phrases.

SUMMARY

A natural language parse ranker of a natural language processing (NLP) system employs a goodness function to rank the possible grammatically valid parses of an utterance. The goodness function generates a statistical goodness measure (SGM) for each valid parse. The parse ranker orders the parses based upon their SGM values. It presents the parse with the greatest SGM value as the one that most likely represents the intended meaning of the speaker. The goodness function of this parse ranker is highly accurate in representing the intended meaning of a speaker. It also has reasonable training data requirements.

With this parse ranker, the SGM of a particular parse is the combination of all of the probabilities of each node within the parse tree of such parse. The probability at a given node is the probability of taking a transition ("grammar rule") at that point. The probability at a node is conditioned on highly predicative linguistic phenomena. Such phenomena include headwords, "phrase level", and "syntactic history," and "modifying headwords."

BRIEF DESCRIPTION OF THE DRAWINGS

FIG. 12 is an example of a computing operating environment capable of implementing the exemplary ranking parser for NLP.

DETAILED DESCRIPTION

Figure 1:
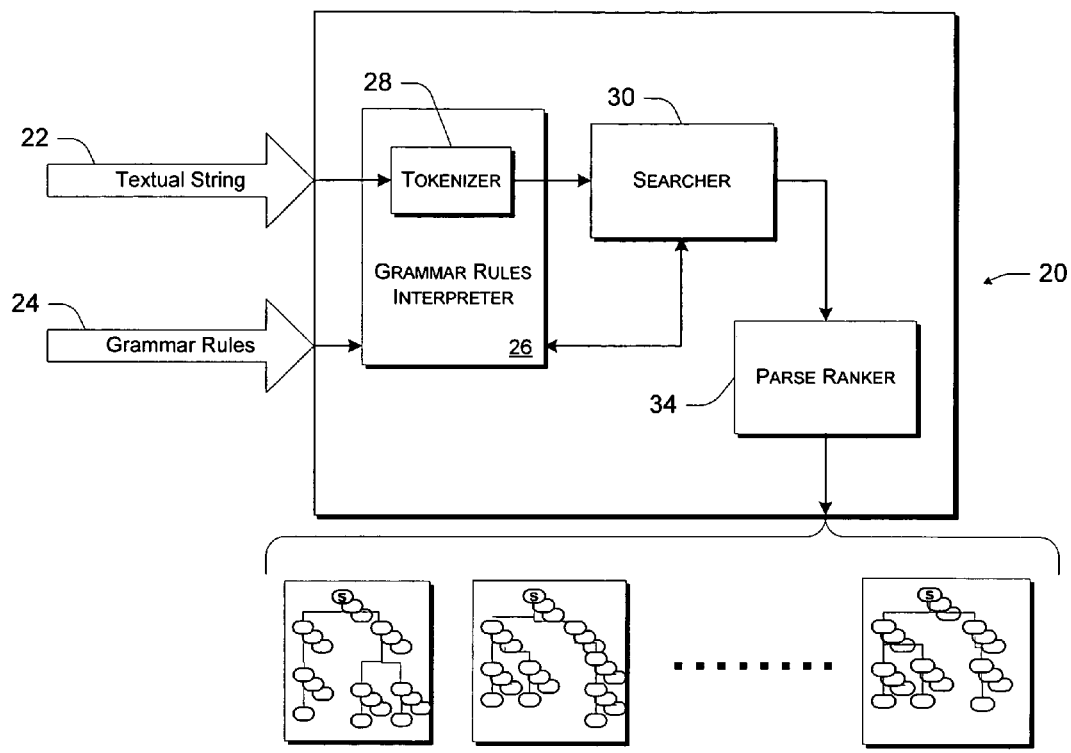
FIG. 1 is a schematic illustration of an exemplary natural language processing system.
Figure 2:
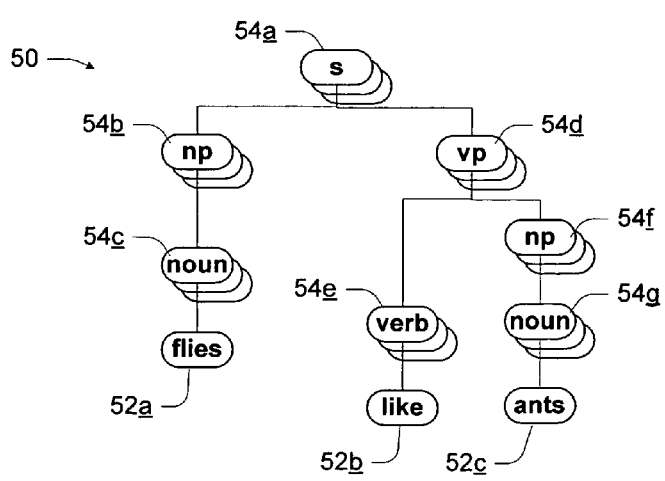
FIG. 2 is an illustration of a typical parse tree representing a syntactically valid parse of sample phrase, "flies like ants."
Figure 3:
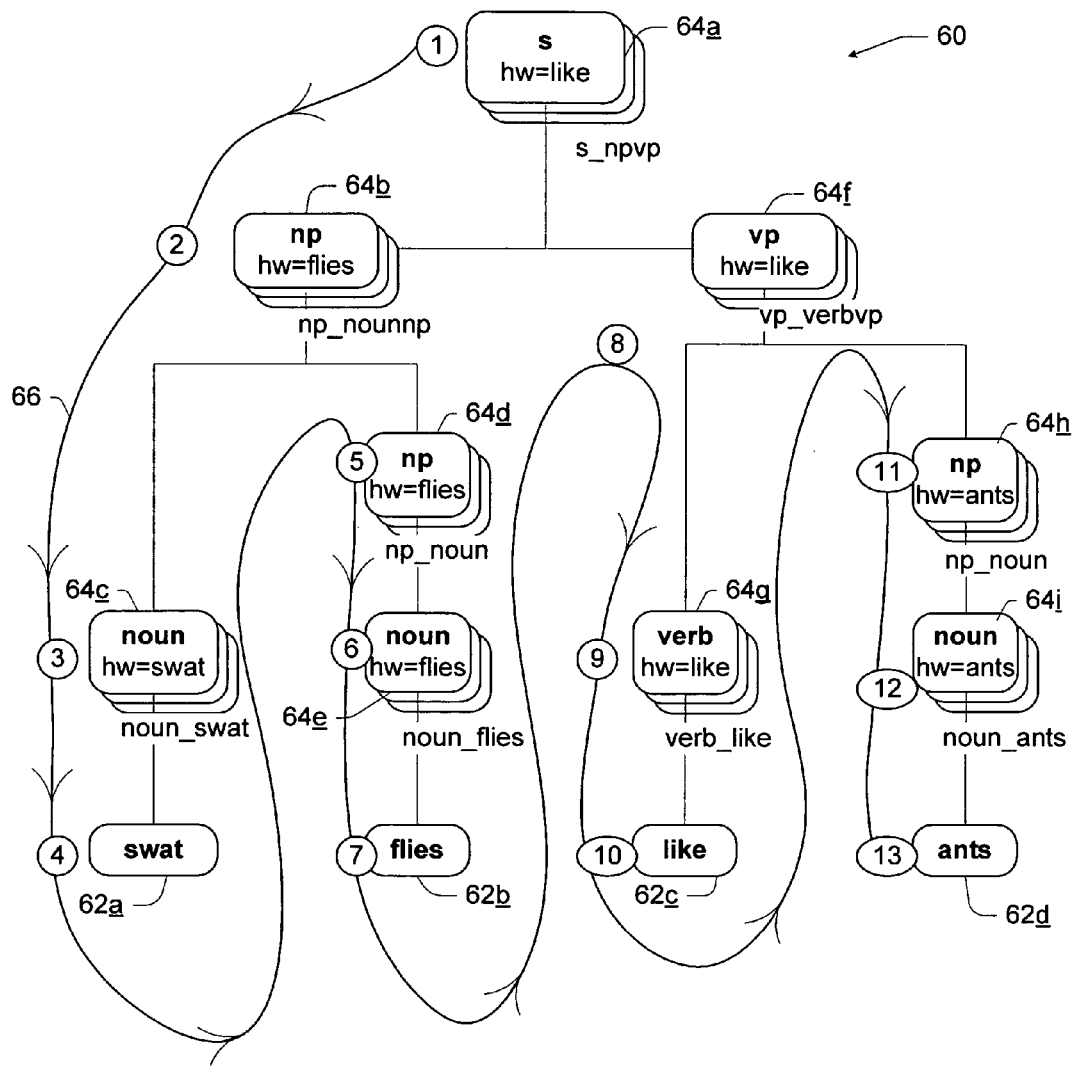
FIG. 3 is another illustration of a typical parse tree representing a syntactically valid parse of sample phrase, "swat flies like ants." This parse tree is annotated to indicate transitions and headwords.
Figure 4A:
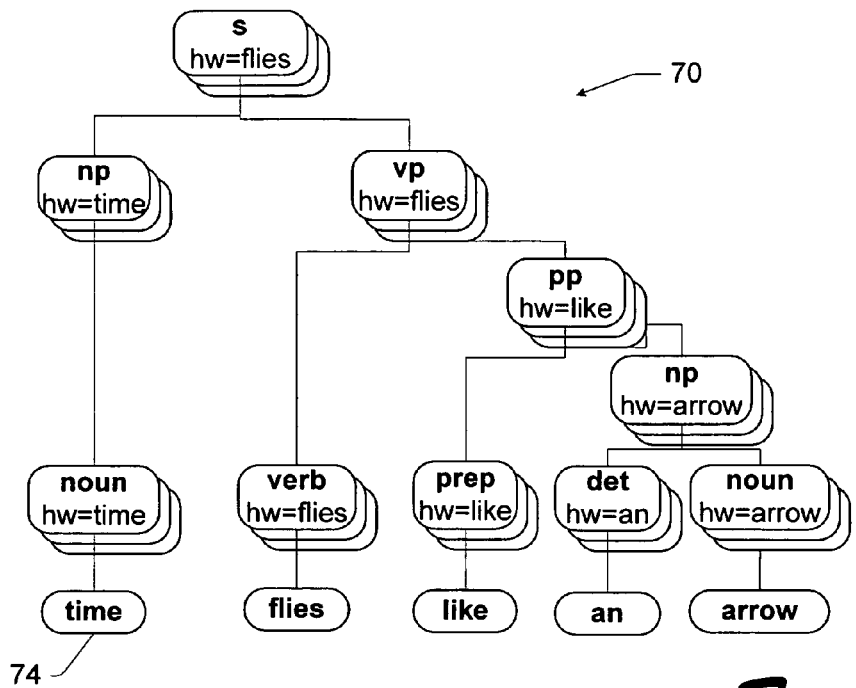
FIGS. 4a and 4b illustrate two exemplary parse trees of two of seven syntactically valid parses of sample phrase, "time flies like an arrow."
Figure 4B:
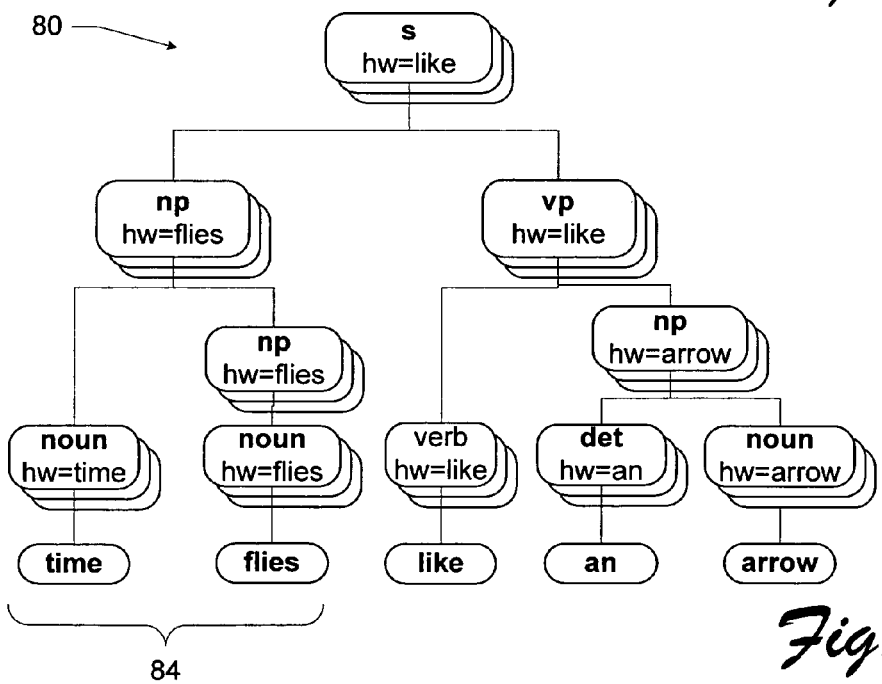

The following description sets forth a specific embodiment of the ranking parser for natural language processing (NLP) that incorporates elements recited in the appended claims. This embodiment is described with specificity in order to meet statutory written description, enablement, and best-mode requirements. However, the description itself is not intended to limit the scope of this patent. Rather, the inventor has contemplated that the claimed ranking parser might also be embodied in other ways, in conjunction with other present or future technologies.

The exemplary ranking parser described herein may be implemented by a program submodule of a natural language processing (NLP) program module. It may also be implemented by a device within a NLP device. For example, a parse ranker 34 in FIG. 1 may be a program module implementing the exemplary parser within a NLP program system 20. Alternatively, the parse ranker 34 in FIG. 1 may be a parse ranker 34 in FIG. 1 may be a device implementing the exemplary parser within a NLP system 20. Alternatively still, instructions to implement the exemplary parser may be on a computer readable medium.

Introduction

The exemplary parser of a NLP system employs a goodness function to rank the possible grammatically correct parses of an utterance. The goodness function of the exemplary parser is highly accurate in representing the intended meaning of a speaker. It also has reasonable training data requirements.

With this exemplary parser, the goodness measure of a particular parse is the probability of taking each transition ("transition probability") within the parse tree of that parse. Each transition probability within the tree is conditioned on highly predicative linguistic phenomena. Such phenomena include headwords, "phrase levels," "syntactic biagrams," and "syntactic history".

Herein, the term "linguistic features" is used to generically describe transitions, headwords, phrase levels, and syntactic history.

Statistical Goodness Measure

The statistical goodness measure (SGM) of the exemplary parser uses a generative grammar approach. In a generative grammar approach, each sentence has a top-down derivation consisting of a sequence of rule applications (i.e., transitions). The probability of the parse tree is the product of the probabilities of all the nodes. The probability for a given node is the probability that from the node one would take a specific transition, given the linguistic features.

The SGM of the exemplary parser may be calculated using either of the following equivalent formulas:

$$\text{Prob(parse)} = \Pi_X \text{Prob}(\text{trn}(n_X), \text{hw}(n_Y), \text{pl}(n_Y), \text{sh}(n_Y), \text{hw}(n_Z), \text{pl}(n_Z), \text{sh}(n_Z) | \text{hw}(n_X), \text{pl}(n_X), \text{sh}(n_X), \text{segtype}(n_X)) \quad \text{Formula A}$$

Or . . .

$$\text{Prob(parse)} = \Pi_X \text{Prob}(\text{trn}(n_X) | \text{hw}(n_X), \text{pl}(n_X), \text{sh}(n_X), \text{segtype}(n_X)) \text{Prob}(\text{modhw}(n_x) | \text{trn}(n_X), \text{hw}(n_X)) \quad \text{Formula B}$$

where $n_X$: is the $X^{th}$ node in a parse tree $n_y$ & $n_z$: are the $Y^{th}$ and $Z^{th}$ nodes and children of the $X^{th}$ node $\text{trn}(n_X)$: is the name of the transition out of $n_X$ of the form $X \rightarrow Y\ Z$ $\text{hw}(n_X)$: is the headword of $n_x$ $\text{pl}(n_X)$: is the phrase level of $n_X$ $\text{sh}(n_X)$: is the syntactic history of $n_X$ $\text{segtype}(n_X)$: is the segtype of $n_X$ $\text{modhw}(n_X)$: is the modifying headword of $n_X$ Those of ordinary skill in the art understand how to generalize these formulas to one child or to three or more children. In addition, there are well-known techniques for converting a ternary (or higher) rule into a set of binary rules.

The exemplary parser defines phrase levels and labels them. Previous conventional approaches clustered transitions by segtype. For example, transitions focused on noun phrases, transitions focused verb phrases, etc. However, within each such grouping, the rules can be further subdivided into multiple levels. These levels are called "phrase levels" herein. These phrase levels are highly predicative of whether a transition will occur.

A null transition is utilized for each phrase level to account for no modification from one level to the next. The null transition enables a node to move to the next level without being altered. The null transition is assigned probabilities just like other transitions.

The exemplary parser defines each node's syntactic history. Previous conventional approaches conditioned on linguistic phenomena associated with a node, its parent, and/or its children. However, such approaches are overly limiting. Using the exemplary parser, phenomena that are predicative but appear elsewhere in the tree (other than simply a node's immediate decedents or ancestors) are included in the probability calculation.

The probabilities of the exemplary parser are conditioned on transition name, headword, phrase level, and syntactic history.

Since the probabilities are conditioned on the transition name in the exemplary parser instead of just the structure of the rule (e.g. VP→NP VP), the parser may give the same structure different probabilities. In other words, there may be two transitions with the same structure that have different probabilities because their transition names are different.

The probabilities of the SGM of the exemplary parser are computed top down. This allows for an efficient and elegant method for computing the goodness function. In the exemplar, the headwards can also be replaced by their lemmas.

A training corpus of approximately 30,000 sentences is used to initially calculate the conditioned probabilities of factors such as transition name, headword, syntactic bigrams, phrase level, and syntactic history. The sentences in this training corpus have been annotated with ideal parse trees and the annotations contain all the linguistic phenomena on which the parser conditions. Of course, more or less sentences could be used. The more sentences used, the higher the accuracy of the probabilities. In addition, there are many known techniques for dealing with insufficient training data.

The probabilities computation method has two phases: training and run-time. During the training phase, the system examines the training corpus, and pre-computes the probabilities (which may be represented as a "count") required at run-time. At run-time, the goodness function is quickly computed using these pre-computed probabilities (which may be "counts").

Conditioning on Headwords

Figure 5A:
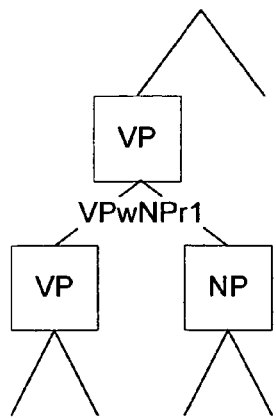
FIGS. 5a and 5b show fragments of two pairs of typical parse trees. The parse tree of FIG. 5a does not use headword annotation, but the parse tree of FIG. 5b does.
Figure 5A:
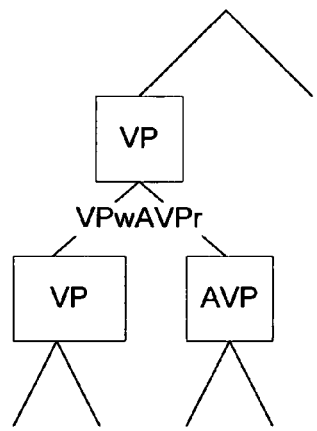

Consider parse trees 90 and 92 shown in FIG. 5a. Assume the two parse trees are identical except for the transition that created the top-most VP (verb phrase).

In Tree 90 of FIG. 5a, the verb phrase was created using the rule:

VPwNPrl: VP→VP NP

VPwNPrl is used to add an object to a verb. For example, "John hit the ball" or "They elected the pope."

In Tree 92 of FIG. 5a, the verb phrase was created using the rule:

VPwAVPr: VP→VP AVP

VPwAVPr is used when an adverbial phrase modifies a verb. For example, "He jumped high" or "I ran slowly."

To determine which tree was most probable using the conventional Transition Probability Approach (TPA), which is described above in the background section, the number of occurrences of VPwNPrl and VPwAVPr in the corpus is counted. If VPwNPrl occurred most often, the conventional TPA's goodness function would rank Tree 90 of FIG. 5a highest.

This may be correct, but often it will be wrong since it will choose Tree 90 of FIG. 5a regardless of the linguistic context in which the rules appear. For example, assume that the headword was "smiled"

Figure 5B:
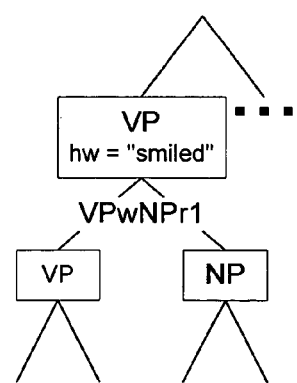
Figure 5B:
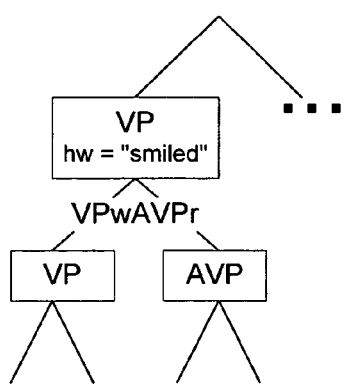

Parse trees 94 and 96 shown in FIG. 5b illustrate the same parses shown in trees 90 and 92 in FIG. 5a, but the headword "smiled" is noted.

English-speaking humans know that Tree 94 of FIG. 5b is highly unlikely. "Smiled" is rarely transitive and rarely takes a direct object. In other words, "She smiled the ball" is incorrect because someone cannot "smile" a "ball." Although, it is correct to say, "She smiled the most" because the "most" is not an object of "smiled." Although "the most" can act as a noun phrase in other contexts, it is an adverb in this case.

If the headword is included into the probability calculations, the goodness function is more likely to pick the correct parse. In particular, instead of just counting up all occurrences of VPwNPrl and VPwAVPr in the corpus, a count is made of how often these rules appear with the headword "smiled." In doing so, it likely to be discovered that there are very few instances of VPwNPrl occurring with the headword "smiled." Thus, the goodness function would calculate the probability of Tree 94 of FIG. 5*b* to be much less than Tree 96 of FIG. 5*b*.

Phrase Level

Phrases (e.g., noun phrases or verb phrases) have a natural structure. The job of the grammar (i.e., grammar rules) is to build this structure. Because of the rules of the language and because of conventions used by the grammarian, there are constraints on how the phrasal structure can be built. This translates into constraints on the order in which the rules can be applied. In other words, some rules must run before other rules. The SGM of the exemplary parser implements phrase levels to make this set of constraints explicit.

Since phrase levels are predicative of what transition can occur at each node in a parse tree, incorporating them into the goodness function makes the goodness function more accurate.

Phrase Level Defined. To define the phrase levels for a given segtype, rules that create the given segtype are grouped into levels. All the rules at a given level modify the segtype in the same way (e.g., add modifiers to the left). The levels are numbered from one to N. Each level contains a null transition that allows a node to move to the next level without having an effect on the phrase being built.

The analysis grammar build a phrase up by first producing an HWϕ from a word. This is the head word of the phrase. It then enforces an order of levels by attaching modifiers of the headword in increasing phrase level order.

For example, consider simple noun phrases in English. When building the parse tree for a noun phrase, the determiner (e.g., "the") is attached after the adjectives describing the noun. For example, "the red book" is correct, but "red the book" is not correct. Therefore, a rule that adds a determiner to a noun phrase must come after the rule(s) that add adjectives. Again, "after" is relevant to creation of a parse tree and the ordering of the application of the grammar rules. The term does not relate to the order of standard writing or reading.

For more complex noun phrases, the grammarian building a set of rules has some options. For example, consider the phrase: "The red toy with the loud In siren." In one set of grammar rules, the structure may be like this:

(The (red (toy (with the loud siren))))

All prepositional phrases (e.g. "with the loud siren") are attached to noun first; adjectives are attached next, and finally the determiner ("the") is added last. Once a determiner is attached to a noun phrase, it is not possible to add additional adjectives or prepositional phrases. Another set of grammar rules might structure it this way:

((The (red toy)) (with the loud siren))

However, as long as a grammar clearly defines the structure of noun phrases, there exist constraints on the order of the rules. In the exemplary parser's SGM, this ordering is made explicit by adding phrase level information to the rules and conditioning our probabilities on these phrase levels.

As another example, consider the following grammar that builds verb phrases. This grammar supports verbs, noun phrases, and adjective phrases, but it has been simplified and does not support a range of other valid linguistic phenomena like adverbs, infinitive clauses, prepositional phrases, and conjunctions.

TABLE 3

| Rule Name | Rule | Description (and an example) |
| --- | --- | --- |
| VERBtoVP | VP → VERB | Promote a verb into a verb phrase |
| PredAdj | VP → VP AJP | Add on an adjective. "It has been found effective" |
| VPwNPr1 | VP → VP NP | Add direct object to a VP "I hit Bill" |
| Perfect | VP → VP VP | Adds the VP "have" to a VP "Joe had gone" |
| SubjPQuant | VP → NP VP | Add quantifiers to the VP like "all", "both", . . . "The children have all gone" |
| VPwNPl | VP → NP VP | Add noun subject to a VP "John jumped." |
| SubjectAJP | VP → AJP VP | Add AJP subject to a VP "More surprising is his attitude" |
| InvertAJPwS | VP → AJP VP | Add final modifier, AJP, to the left of a VP "More remarkable still, he went" |
| Topicalization | VP → NP VP | Add object of VP, NP, to the left of a VP "A better-looking man I have not seen" |

This grammar can parse simple verb phrases like those shown in the description column above and complex phrases like:

"More surprising, we have all found useful the guidelines which were published last year"

Figure 6A:
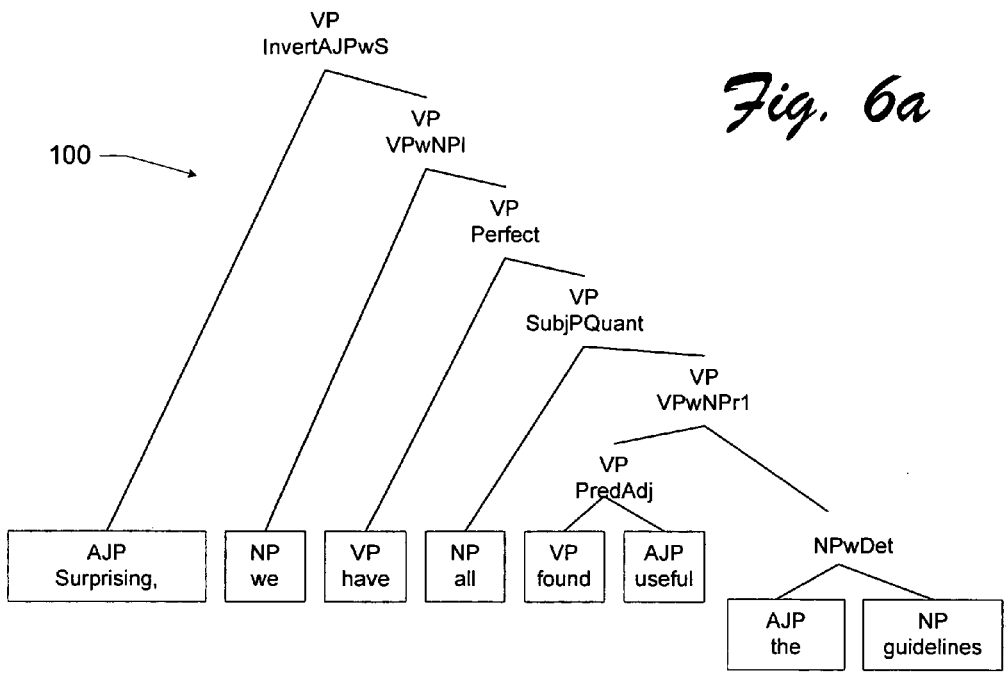
FIGS. 6a and 6b show fragments of two pairs of typical parse trees. The parse tree of FIG. 6a shows a parse done in accordance with an exemplary grammar. The parse tree of FIG. 6b shows a parse tree that includes a null transition.

FIG. 6*a* shows a parse tree 100 representing a parse of the above sentence, where the parse is done in accordance with the example grammar provided above.

To build complex verb phrases, this grammar enforces an ordering on the rules. First, VerbtoVP always runs to create the initial verb phrase. Then, post modifiers are added using PredAdj and/or VPwNPr1. Then "have" and quantifiers can be added. Next, the subject is added using SubjAJP or VPwNPl. Finally, topicalization and inverted AJP can be applied to phrases that have a subject.

This example helps explain "topicalization." Start, for example, with the phrase "I eat nematodes." The object of the verb, nematodes, can be put before the subject. This leads to "Nematodes I eat." The movement of the object is called topicalization, and hence the rule name.

Constraints, such as the following, are made explicit by adding the phrase level (of the exemplary parser) into the grammar rules:

TABLE 4

| Phrase Level | Rule Name | Rule | Level Description |
| --- | --- | --- | --- |
| 1 | VERBtoVP | VP(1) → VERB(PL_Verb_Max) | Create a VP |
| 2 | PredAdj | VP(2) → VP(1) AJP(PL_AJP_Max) | Add post modifiers |
|   | VPwNPr1 | VP(2) → VP(1) NP(PL_AJP_Max) |   |

TABLE 4-continued

| Phrase Level | Rule Name | Rule | Level Description |
|---|---|---|---|
| | VPNull2 | VP(2) → VP(1) | |
| 3 | Perfect | VP(3) → VP(1) VP(2,3) | Add "have" and |
| | SubjPQuant | VP(3) → NP(PL_NP_Max) VP(2,3) | quantifiers |
| | VPNull3 | VP(3) → VP(2) | |
| 4 | VPwNPI | VP(4) → NP(PL_NP_Max) VP(3) | Add subject |
| | SubjectAJP | VP(4) → AJP(PL_AJP_Max) VP(3) | |
| | VPNull4 | VP(4) → VP(3) | |
| 5 | InvertAJPwS | VP(5) → AJP(PL_AJP_Max) VP(4) | Add modifiers to VPs |
| | Topicalization | VP(5) → NP(PL_NP_Max) VP(4) | that have a subject |
| | VPNull5 | VP(5) → VP(4) | |

As shown above in Table 4 on the right-hand side of each rule, each constituent is associated with a particular phrase level that is required for that constituent. Specifically, the number in parenthesis indicates the phrase level of the constituent (e.g., "VP(4)").

On the left-hand side of the rule, the phrase level of the resulting node is specified. For example, consider the null transition:

VP(4)→VP(3)

This null transition can be applied to a VP at phrase level three and create a VP at phrase level four.

"PL_XP_Max" in a phrase level indicator means the highest phrase level that occurs for a given segtype. For example, for the grammar above VP(PL_XP_Max) would be the same as VP(5). As another example:

VPwNPl: VP(4)→NP(PL_XP_Max) VP(3)

This means that the rule can be applied to an NP that is at the highest NP is level and to a VP that is at level three. The result of running the rule is to create a VP at level four.

Sometimes, the phrase level of a constituent of the same segtype as the resulting node may be either at the phrase level of the resulting node of less than the phrase level of the resulting node. For example:

Perfect: VP (3)→VP(1) VP(2,3)

He melted.
He had melted.
He had been melted.

To see an example of null transitions, consider the phrase: "Surprising, we found useful the guidelines."

Notice that this phrase differs from the similar phrase used above in that ". . . we have all found useful . . . " has been simplified to be ". . . we found useful . . . "

Figure 6B:
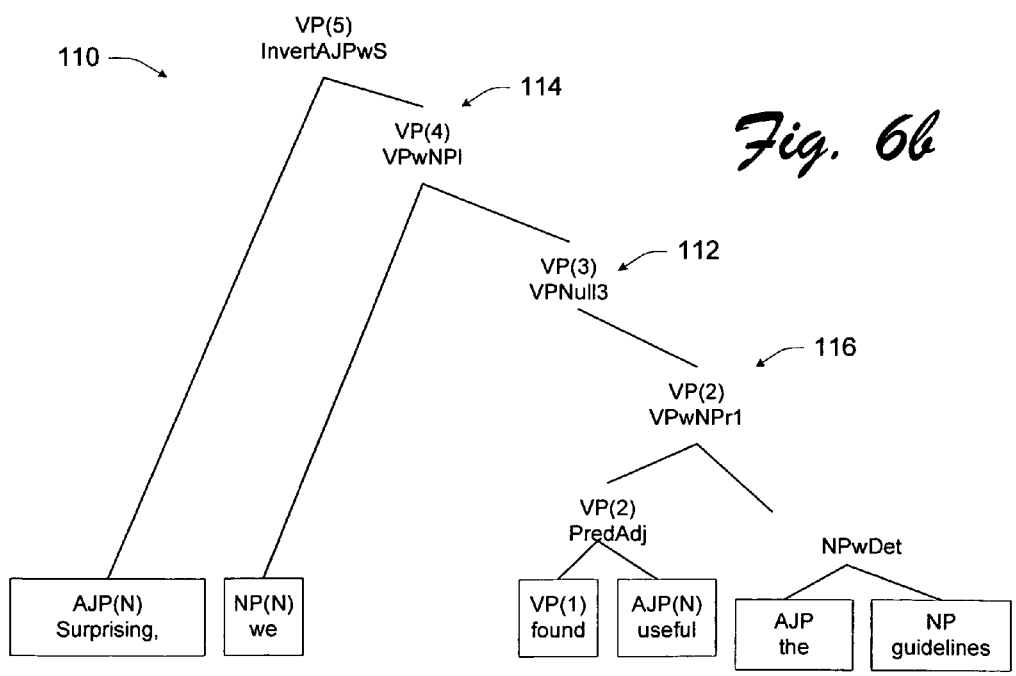

FIG. 6b shows a parse tree 110 representing a parse of this sentence.

The rule VPwNPl at transition 114 requires the second constituent 116 to have PL3. Because the constituent has PL2 we construct a null transition.

The null transition at 112 is used to move the VP(2) to be a VP(3). The null transition can be explicitly represented in the parse tree (as shown in FIG. 6b) or be implicit. It doesn't matter as long as it is taken into account in the computation of the probabilities of the exemplary parser.

Conditioning on phrases levels means that any parse tree that violates the phrase level constraints can be eliminated (given probability equal to zero) by the exemplary parser.

Modeling the Syntactic Modification of Individual Words. In the exemplary parser, the use of phrase levels and null transitions accurately model the syntactic way that words "want" to be modified. This has not been done with any conventional parser and goodness function.

The Penn Tree Bank is the focus of most of those working on probabilistic grammars. The Penn Tree Bank is annotated with parts of speech for the words and minimal phrase names and brackets. The syntactic relationships between constituents are not given. Without data to model, one does not develop a realistic model. There is no explicit grammar given that would produce the bracketing for the parses in the Penn Tree Bank. The great majority of those working on the Penn Tree Bank computationally induce a grammar from the annotation. The number of transitions so induced generally run to the thousands.

There is no clear hierarchy to the supplied bracketing annotations. Because of this, there is no obvious way to describe a hierarchy by defining in what order modifiers are to be attached to the head. Because there is not hierarchy, there is not place to put null transitions.

In contrast, the phrase levels and null transitions of the exemplary parser 11 models the grammar of the English natural language. For example, consider the noun "nut." You would never see a sentence such as 'I want nut.' or 'Nut is on the table.' The word "nut" wants a determiner such as "a" or "the". The phrase levels and null transitions force the exemplary parser to explicitly consider the absence of modifiers, as well as their presence.

Since any transition has a probability of 1 or lower, the more transitions in a sentence or phrase implies a smaller goodness measure. Therefore, when calculating the goodness measure using conventional approaches, the sentence "I want nut" would be preferred over the sentence "I want a nut." This is because the latter has more transition; therefore, the goodness measure would be less than the former.

Since the exemplary parser considers the lack of modifiers (such as pre-determiners, determiners, attributive adjectives and adverbs, post-modifiers, etc.) when calculating the goodness measure, the sentence 'I want a nut' has a greater goodness measure than 'I want nut.' Thus, "I want a nut" is preferred over "I want nut." Although "I want a nut" appears, at a surface level, to have more transitions and thus should have a lower goodness measure using conventional approaches. However, using the exemplary parser the contextually correct sentence "I want a nut" is preferred over "I want nut." No conventional approach has this property. Another example set is 'I admonish the children.' and 'I admonish.'

In the exemplary parser, the transition probabilities are conditioned on headwords. Using a training corpus, the exemplary parser counts up the number of times a specific headword is modified by a rule and the number of times it isn't.

Syntactic History

A node's syntactic history is the relevant grammatical environment that a node finds itself in. It may include the history of transitions that occur above the node. For example, is the node below a NREL, PRPRT, PTPRT, RELCL, or AVPVP? It may include whether the node is in a passive or an active construction. It may include information that appears elsewhere in the tree. For example, whether the headword of a sibling node is singular or plural. The specifics of what it relevant is dependent upon the specifics of the grammar (i.e., rewrite rules or transitions) being used.

Figure 7:
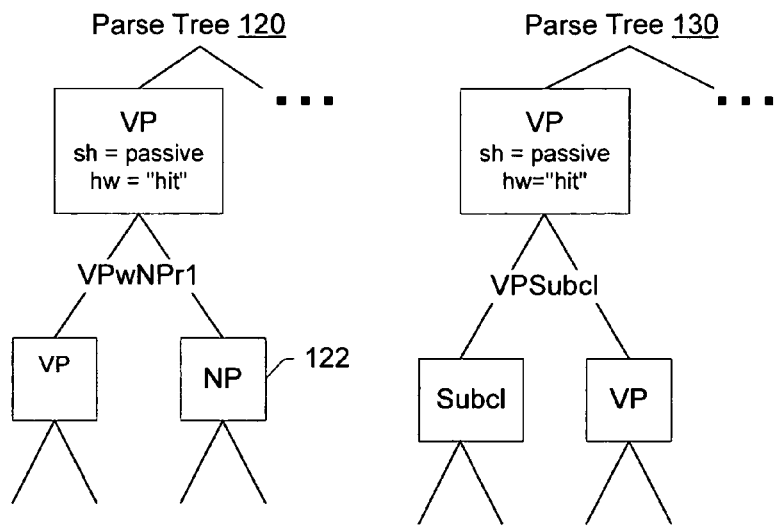
FIG. 7 shows fragments of a pair of typical parse trees and illustrates the use of syntactic history.

For example, FIG. 7 shows two parse trees, 120 and 130, for the same verb phrase. Both trees are parsing a verb phrase having the mono-transitive headword (hw="hit") and the verb phrase is known to be passive (sh=passive). In tree 120, the verb has a direct object as represented by NP at 122. In tree 130, the verb does not take a direct object.

In English, a mono-transitive verb inside a passive construction does not take a direct object. In contrast, when in the active form, the mono-transitive verb "hit" takes a direct object. For example, "I hit the ball" in the active form has a direct object "ball" to the verb "hit", but "the ball was hit" in the passive form has no direct object to "hit."

English-speaking humans know that tree 120 will never occur. In other words, there is a zero probability of a mono-transitive verb (like "hit") taking a direct object when the sentence is passive.

In the exemplary parser, the transition probabilities are conditioned on syntactic history as well as headwords. Using a training corpus, the exemplary parser counts up how often VPwNPrl occurs in a passive construction with a mono-transitive verb and finds that it never occurs. Thus, the probability of Tree 120 would be calculated to be zero.

Propagated Syntactic History. Syntactic history can be propagated down many levels of the tree. Take, for example, the sample sentence, "Graceland, I love to visit." The thing ("Graceland") that "I" love to visit is stated before it is revealed the "I" loves to visit anything.

Figure 8:
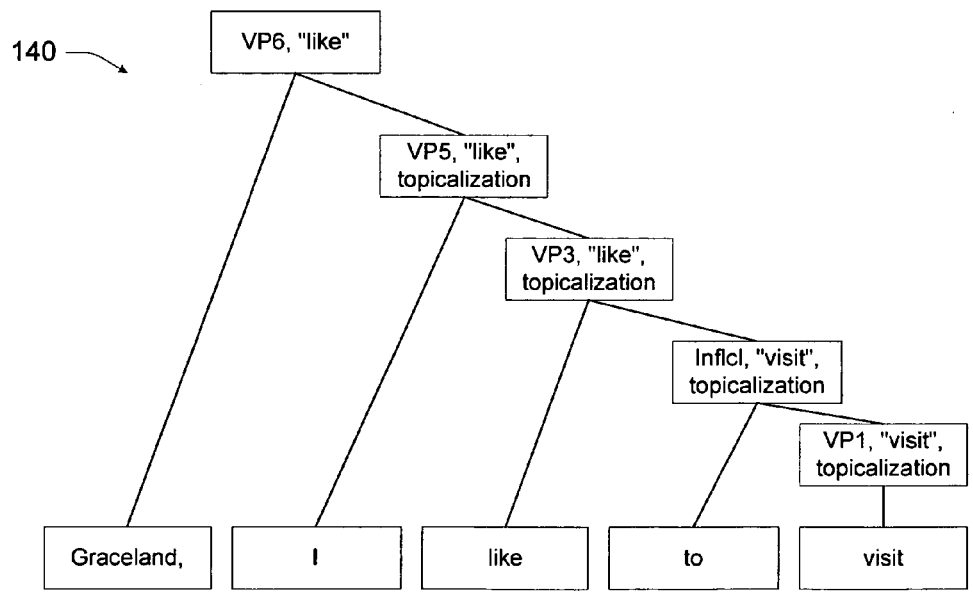
FIG. 8 shows a typical parse tree of a sample sentence, "Graceland, I like to visit." This figure illustrates the "topicalization" syntactic phenomenon.

FIG. 8 shows an annotated parse tree 140 of a parse of this sample sentence. As can be seen in FIG. 8, the "topicalization" feature is propagated past the verb "like" to the verb "visit."

Examples of Syntactic Phenomena. The following is a list of syntactic phenomena that are incorporated in a syntactic history. This list is intended to provide examples of syntactic phenomena tracked as syntactic history by the exemplary parser. This is list is not exclusive of other possible phenomena and is not intended to be limiting.

These phenomena are well known by linguists, but have not been used by computational linguists when considering conditional probabilities for parsers. For each phenomenon, sample sentences are provided and a general description (or examples) of why such phenomenon affects a phrase or sentence.

Passive.
Sample sentences:
  The cabbage was licked by the rabbit.
  The bomb must have been detonated from a distance.
  He was born on a log table.
Affect:
The verb in the passive construction (e.g., "lick", "detonate", "bore") in the great majority of cases does not take a syntactic object as a post-modifier.
Passive is at the same phrase level as progressive, perfect, and modal.
However, if a passive construction is being built, those are not allowed as transition below the passive and the verb that is passivized. (E.g., The bomb must be had detonated.) However, the converse is not true, passive must follow progressive, perfect, or modal.

Perhaps, this example will better illustrate. Suppose the kernel phrase is "The boy ate the banana." If so, then:
  Perfect: "The boy had eaten the banana."
  Progressive: "The boy was eating the banana."
  Passive: "The banana was eaten by the boy."
  One can combine all these together: "The banana had been being eaten by the boy."

In English, the Passive marking is closest to the verb, followed by the Progressive, followed by the Perfect. You can not say: The banana been being had eaten by the boy."

Negative Polarity.
Sample sentences:
  Never had I seen such chaos.
  Seldom would he be home before 4 a.m.
  Rarely did he pass exams.
Affect:
Compare the first sentence to the kernel representation: "I had never seen such chaos." When the negation ("never") is fronted for focusing purposes there must be subject-verb inversion: note the 'had' before the 'I'.

Domodal Fronting.
Sample sentences:
  Had I seen such chaos?
  Would he be home before 4 a.m?
  Did he pass exams?
Affect:
A question can be formed by inverting the subject and an 'auxiliary' verb. Then there is a lack of number agreement between the subject and the verb that follows the subject. By conditioning on DOMODAL_FRONTING the exemplary parser knows to expect this disagreement.

There are restrictions on what can be between the fronted verb and the subject. One would not normally say "Did frequently he pass exams?' However, one could say "Frequently he passed exams."

Comparative.
Sample sentences: (These are a small subset of the types of comparative constructions in English.)
  The artichoke has more brains than the rock does.
  The limpet is more beautiful than any defoliant can be.
  She worked harder than Filbert thought was possible.
Affect:
The samples above show a clause (denoted by underscore) modifying a noun, adjective, and adverb respectively. This is generally a rare construction, however it is common for constructing comparatives. For a comparative structure like this, all other post-modifiers are reduced in probability. By conditioning on the fact that grammar built a comparative structure, the exemplary parser can determine how well the construction follows type.

Imperative.
Sample sentences:
  Go to your room now.
  Pour three ounces of the gin into the vermouth.
  Please pass the trisodium phosphate.
Affect:
Sentences usually have subjects. Imperatives don't. However, it is less likely that 'tensed' clauses within sentences lack subjects. By conditioning on whether the parser is building a sentence or embedded clause, the parser can apportion the lack of subject correctly.

Topicalization Of Verb Object. Sample sentences:
Graceland, I love to visit.
This book I must read.
Affect:

In both 'Graceland, I love to visit.' and 'I love to visit Graceland.' the verb "visit" has the syntactic object "Graceland." However, in this case, a different rule, at a different phrase level (Topicalization), is used to attach the object to the verb than the usual VPwNPp. If Topicalization is used then the probability of VPwNPp must be lowered when the parser get to the phrase level it operates on.

SGM of the Exemplary Parser

The SGM (statistical goodness measure) of the exemplary parser uses a generative grammar approach—each sentence has a top-down derivation consisting of a sequence of rule applications (transitions). The probability of a parse tree is the product of the probabilities of all the nodes within that tree.

Generally, the probability of a node is defined as a conditional probability:

$$\text{Prob(node)} = \text{Prob(what\_is\_unknown} | \text{what\_is\_known)} \quad \text{Formula 1}$$

Assume that each node is visited in a depth-first tree walk. What is known is the information associated with the node and/or with any node previously encountered in the tree walk. For example, the properties of the node, its headword, phrase level, syntactic history, and segtype. What is unknown is what occurs below the node (i.e., the transition taken and the properties of its children).

Figure 9:
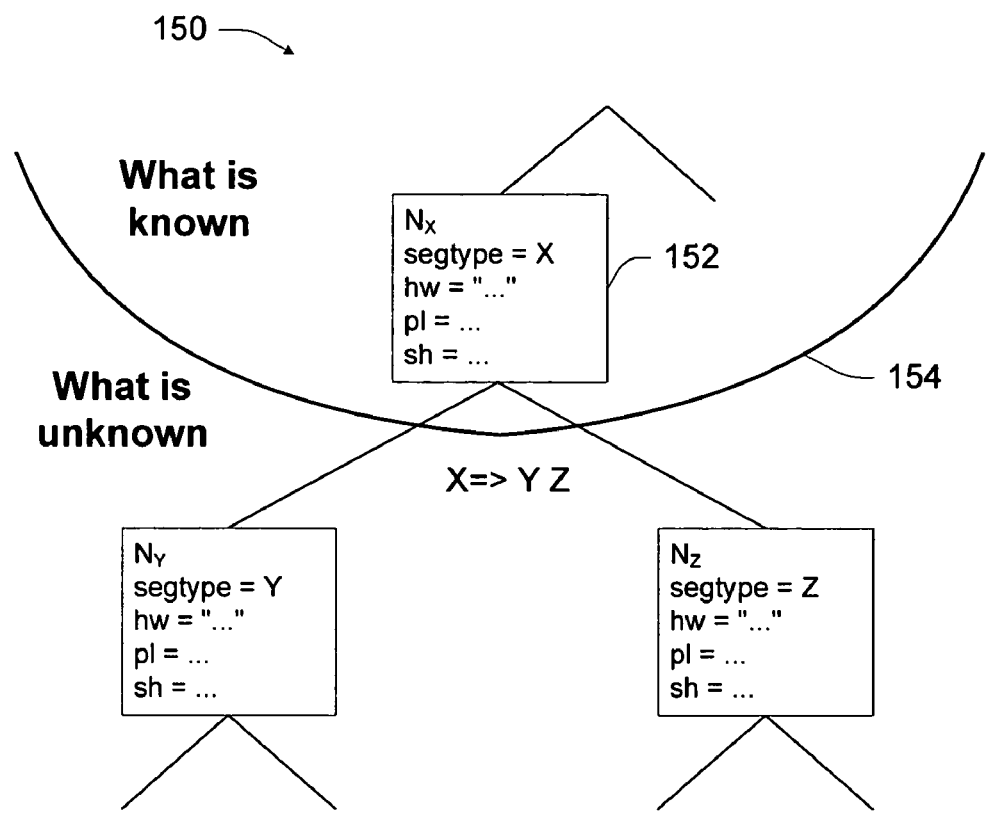
FIG. 9 shows a fragment of a genericized parse tree. This figure illustrates what is known and not known at a node.

FIG. 9 shows a portion of a parse tree 150 and visually illustrates what is known and unknown at a node 152. What is known is above line 154 because it has already been processed. Below line 154 is what is unknown because it has not been processed.

With reference to the parse tree 150 of FIG. 9, the conditional probability of exemplary parser is:

$$\text{Prob(parse)} = \Pi_X \text{Prob}(n_X) = \Pi_X \text{Prob}(\text{trn}(n_X), \text{hw}(n_Y), \text{pl}(n_Y), \text{sh}(n_Y), \text{hw}(n_Z), \text{pl}(n_Z), \text{sh}(n_Z) | \text{hw}(n_X), \text{pl}(n_X), \text{sh}(n_X), \text{segtype}(n_X)) \quad \text{Formula 2}$$

where $n_X$ ranges over all nodes in the tree and the transition named by $\text{trn}(n_X)$ is of the form X→Y Z or of the form X→Y.

To simplify Formula 2, it is noted that not all the parameters are independent. In particular, $\text{trn}(n_X)$ and $\text{pl}(n_X)$ imply $\text{pl}(n_Y)$ and $\text{pl}(n_Z)$. In other words, the name of the transition and the phrase level at node X implies the phrase levels of nodes Y and Z. Therefore, $\text{pl}(n_Y)$ and $\text{pl}(n_Z)$ may be removed from the left-hand side of the formula:

$$= \Pi_X \text{Prob}(\text{trn}(n_X), \text{hw}(n_Y), \text{sh}(n_Y), \text{hw}(n_Z), \text{sh}(n_Z) | \text{hw}(n_X), \text{pl}(n_X), \text{sh}(n_X), \text{segtype}(n_X)) \quad \text{Formula 3}$$

Similarly, Formula 3 may be simplified because the ranking is not directly determined by what the syntactic history is, versus its effects on the structure. Therefore, $\text{sh}(n_Y)$ and $\text{sh}(n_Z)$ may be removed from the from the left-hand side of the formula:

$$= \Pi_X \text{Prob}(\text{trn}(n_X), \text{hw}(n_Y), \text{hw}(n_Z) | \text{hw}(n_X), \text{pl}(n_X), \text{sh}(n_X), \text{segtype}(n_X)) \quad \text{Formula 4}$$

Formula 4 may be further simplified. Tracking both $\text{hw}(n_Y)$ and $\text{hw}(n_Z)$ is not particularly valuable because one of them is the same as $\text{hw}(n_X)$. The one that is not the same is the modifying headword. The notation $\text{modhw}(n_X)$ to refer to this modifying headword. This yields:

$$= \Pi_X \text{Prob}(\text{trn}(n_X), \text{modhw}(n_X) | \text{hw}(n_X), \text{pl}(n_X), \text{sh}(n_X), \text{segtype}(n_X)) \quad \text{Formula 5}$$

Formula 5 may be simplified still further by applying the chain rule (as understood by those skilled in the art of statistics):

$$= \Pi_X \text{Prob}(\text{trn}(n_X) | \text{hw}(n_X), \text{pl}(n_X), \text{sh}(n_X), \text{segtype}(n_X)) * \text{Prob}(\text{modhw}(n_X) | \text{trn}(n_X), \text{hw}(n_X), \text{pl}(n_X), \text{sh}(n_X), \text{segtype}(n_X)) \quad \text{Formula 6}$$

Since $\text{trn}(n_X)$ implies $\text{pl}(n_X)$ and $\text{segtype}(n_X)$, Formula 6 can further be simplified to:

$$= \Pi_X \text{Prob}(\text{trn}(n_X) | \text{hw}(n_X), \text{pl}(n_X), \text{sh}(n_X), \text{segtype}(n_X)) * \text{Prob}(\text{modhw}(n_X) | \text{trn}(n_X), \text{hw}(n_X), \text{sh}(n_X)) \quad \text{Formula 7}$$

Finally, since it has been found that $\text{sh}(n_X)$ is not very predicative of what the modifying headword will be, Formula 7 can be approximated by removing $\text{sh}(n_X)$ from that part of Formula 7:

$$\cong \Pi_X \text{Prob}(\text{trn}(n_X) | \text{hw}(n_X), \text{pl}(n_X), \text{sh}(n_X), \text{segtype}(n_X)) \text{Prob}(\text{modhw}(n_X) | \text{trn}(n_X), \text{hw}(n_X)) \quad \text{Formula 8 (SGM for a parse)}$$

Notice that Formula 8 above is Formula B recited near the beginning of this detailed description.

In addition, the lemma of the headword can be used in place of the headword.

PredParamRule Probability and SynBigram Probability

As described above, the probability of a parse tree is the product of the probabilities of each node. The probability of each node is the product of two probabilities. Thus, the SGM probability formula for a single node in a tree may be rewritten like this:

$$\text{Prob}(\text{trn}(n_X) | \text{hw}(n_X), \text{pl}(n_X), \text{sh}(n_X), \text{segtype}(n_X)) \\ \text{Prob}(\text{modhw}(n_X) | \text{trn}(n_X), \text{hw}(n_X)) \\ \text{Formula 9 (SGM probability at a given node X)}$$

where X ranges over all the nodes in the parse tree.

This represents the statistical goodness measure (SGM) of the exemplary parser. This may be divided into to two parts. For convenience, the first probability will be called the predictive-parameter-and-rule probability or simply "PredParamRule Probability" and the second probability will be called the "SynBigram Probability".

The PredParamRule Probability is:

$$\text{Prob}(\text{trn}(n_X) | \text{hw}(n_X), \text{pl}(n_X), \text{sh}(n_X), \text{segtype}(n_X)) \\ \text{Formula 10 (PredParamRule Probability)}$$

Unlike the Simple Content Dependent Approach (described above in the background section), the PredParamRule Probability of the exemplary parser conditions upon headword, segtype, phrase level, and syntactic history. Since these are highly predicative of the contextually correct parse, this PredParamRule Probability is a significantly more accurate goodness function than conventional techniques.

The SynBigram Probability is:

$$\text{Prob}(\text{modhw}(n_X) | \text{trn}(n_X), \text{hw}(n_X)) \\ \text{Formula 11 (SynBigram Probability)}$$

The SynBigram Probability computes the probability of a syntactic bigram. Syntactic bigrams are two-word collocation. The probability measures the "strength" of the likelihood of a pair of words appearing together in a syntactic relationship. For example, the object of the verb "drink" is more likely to be "coffee" or "water" than "house".

As described above in the background section, this is a conventional technique to calculate a goodness measure. However, with existing conventional syntactic bigram approaches, it is used alone to calculate the goodness function and it requires a huge training corpus.

The exemplary parser overcomes the limitations of conventional syntactic bigram approaches by further conditioning the goodness measure on independent probability characteristics. In particular, those characteristics are represented by the PredParamRule Probability formula (Formula 10).

As a review, the following is a known about calculating conditional probabilities by counting appearances in a training corpus:

$$Prob(x \mid y) = \frac{Prob(x \& y)}{Prob(y)}$$
$$= \frac{Count(x \& y)}{Count(y)}$$

Therefore, the PredParamRule Probability and the SynBigram Probability can be calculated by counting the appearances of relevant events in the training corpus. The probabilities of a given training corpus that are determined by the PredParamRule Probability and the SynBigram Probability may be generally called "language-usage probabilities" for that given training corpus.

Thus, the PredParamRule Probability formula (Formula 10) may be calculated as follows:

$$PredParamRule\ Probability =$$
$$Prob(trn(n_x) \mid hw(n_x), pl(n_x), sh(n_x), segtype(n_x)) =$$
$$\frac{Count(trn(n_x) \& hw(n_x) \& pl(n_x) \& sh(n_x) \& segtype(n_x))}{Count(hw(n_x) \& pl(n_x) \& sh(n_x) \& segtype(n_x))}$$

Formula 12

Moreover, the SynBigram Probability formula (Formula 11) may be calculated as follows:

$$SynBigram\ Probability =$$
$$Prob(modhw(n_x) \mid trn(n_x), hw(n_x)) =$$
$$\frac{Count(modhw(n_x) \& trn(n_x) \& hw(n_x))}{Count(trn(n_x) \& hw(n_x))}$$

Formula 13

Two Phases of SGM Calculation

Typically, a parser of an NLP system (such as the exemplary parser) is designed to quickly calculate the goodness measure for many parse trees of parses of a phrase. To accomplish this, the exemplary parser is implemented in two phases: "training" and "run-time."

During the training phase, the exemplary parser pre-calculates the counts that are needed to compute the PredParamRule Probability and the SynBigram Probability at run-time. Although this process tends to be time-consuming, processor-intensive, and resource-intensive, it only need be done once for a given training corpus.

The result of the training phase is a set of counts for headword, phrase level, syntactic history, and segtype. If the training corpus approximates the natural language usage of a given purpose (general, specific, or customized), then the counts also approximate the natural language usage for the same purpose.

At run-time, these pre-calculated counts are used to quickly determine the probability of the parse tree. Each phrase is parsed into multiple parse trees. Each parse tree is given a SGM based upon the pre-calculated counts.

Alternatively, the training and run-time phase may be performed nearly concurrently. The training phase may be performed on a training corpus (or some subset of such corpus) just before the run-time phase is performed. Those who are skilled in the art will understand that time and space trade-offs may be made to accommodate the given situation.

Regardless, the training phase (or some portion thereof) is performed, at least momentarily, before the run-time phase. This is because the training phase provides the foundation for the run-time phase to base its SGM calculations.

Training Phase

Figure 10:
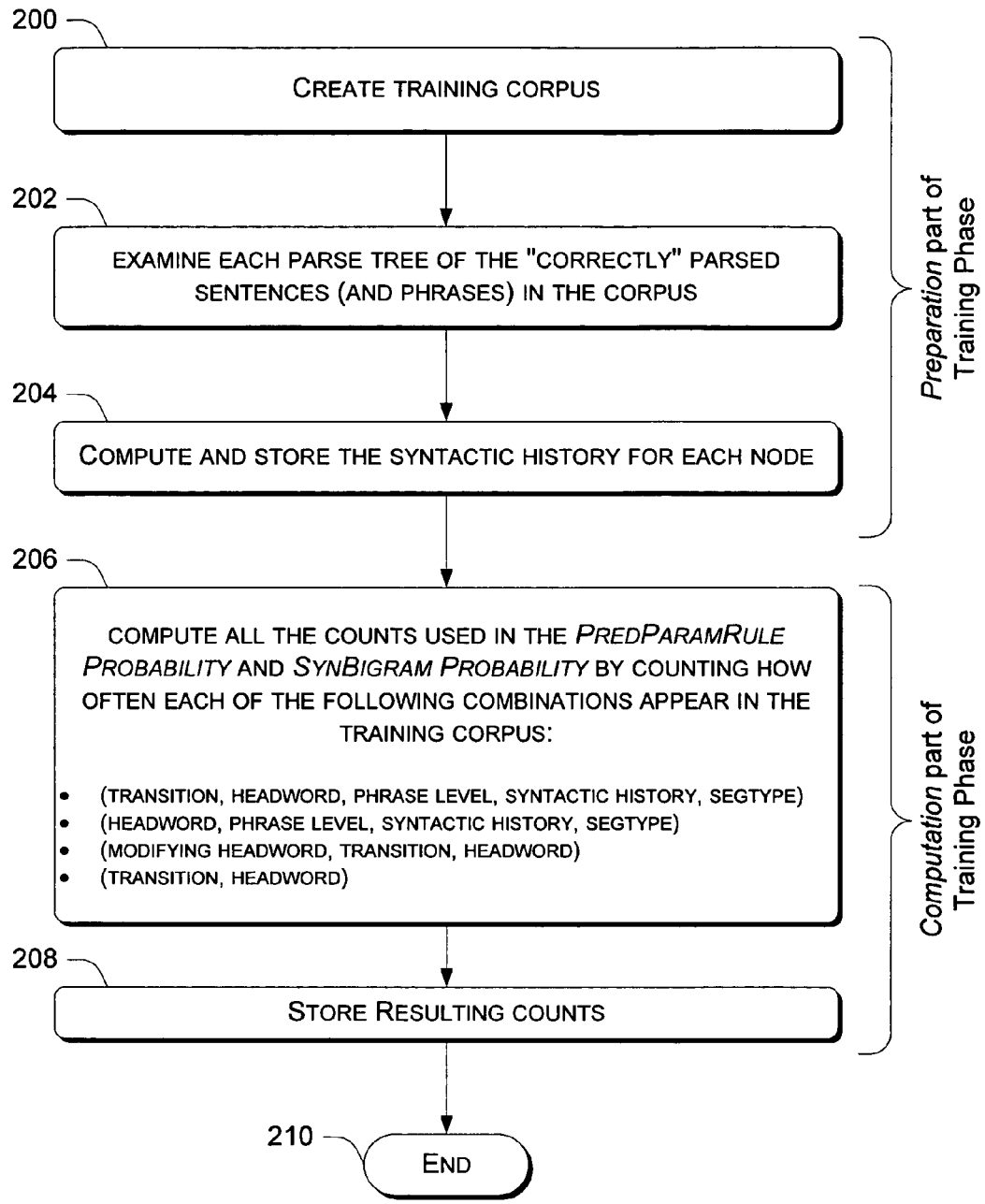
FIG. 10 is a flowchart illustrating the methodology of an implementation of the training phase of the exemplary parser.

FIG. 10 shows a methodological implementation of the training phase of the exemplary parser. The training phase has two parts: the preparation part and the computation part. The preparation part is performed before the computation part.

During the preparation part, a training corpus is created at 200. The training corpus includes a body of "correctly" parsed sentences (and phrases) that the parser can use to determine correct goodness measures for similarly structured sentences. At 202, the parser examines each parse tree of the "correctly" parsed sentences (and phrases) of the corpus. To examine the corpus, a depth-first tree walk is performed on each parse tree. At 204, the syntactic history for each node is computed and stored in the node.

After the training corpus is created in the preparation part, the computation part of the training phase begins at 206. This part computes all the counts, at 206, used in the PredParamRule Probability and SynBigram Probability. Those of ordinary skill in the art can use formula 2 directly, or any simplification thereof. In other words, the exemplary parser counts how often each of the following combinations are seen in the training corpus:

(transition, headword, phrase level, syntactic history, segtype)
(headword, phrase level, syntactic history, segtype)
(modifying headword, transition, headword)
(transition, headword)

In the exemplary implementation of the parser, this is done by creating four multi-dimensional arrays—one for each set of counts. In particular, the following arrays are used:

RuleCountNumerator: Each entry stores the count for a different combination of the transition, headword, phrase level, syntactic history, and segtype. These counts are used in the numerator of the PredParamRule Probability.

RuleCountDenominator: Each entry stores the count for a different combination of headword, phrase level, syntactic history, and segtype. These counts are used in the denominator of the PredParamRule Probability.

BigramCountNumerator: Each entry stores the count for a different combination of modifying headword, transition, and headword. These counts are used in the numerator of the SynBigram Probability.

BigramCountDenominator: Each entry stores the count for a different combination of transition and headword. These counts are used in the denominator of the Syn-Bigram Probability.

In the exemplary implementation of the parser, the arrays initially contain all zeros. All nodes in the training corpus are examined and the corresponding entries in the arrays are incremented. At 208, the results are stored. At 210, the process ends.

This process may be described by the following exemplary pseudocode:

```
For each parse tree t in the training corpus
    For each node n in t
        RuleCountNumerator(trn(n), hw(n), pl(n), sh(n), segtype(n)) =+1;
        RuleCountDenominator(hw(n), pl(n), sh(n), segtype(n)) =+1;
        BigramCountNumerator(modhw(n), trn(n), hw(n)) = +1;
        BigramCountDenominator(trn(n), hw(n)) = +1;
    End loop
End loop
```

Run-Time Phase

Given the counts computed in the training phase (described above), the goodness measure for a given parse tree may be calculated quickly and efficiently. The probability of the tree is the product of the probabilities of the nodes and the probability of each node is quickly computed using the pre-computed counts.

Figure 11:
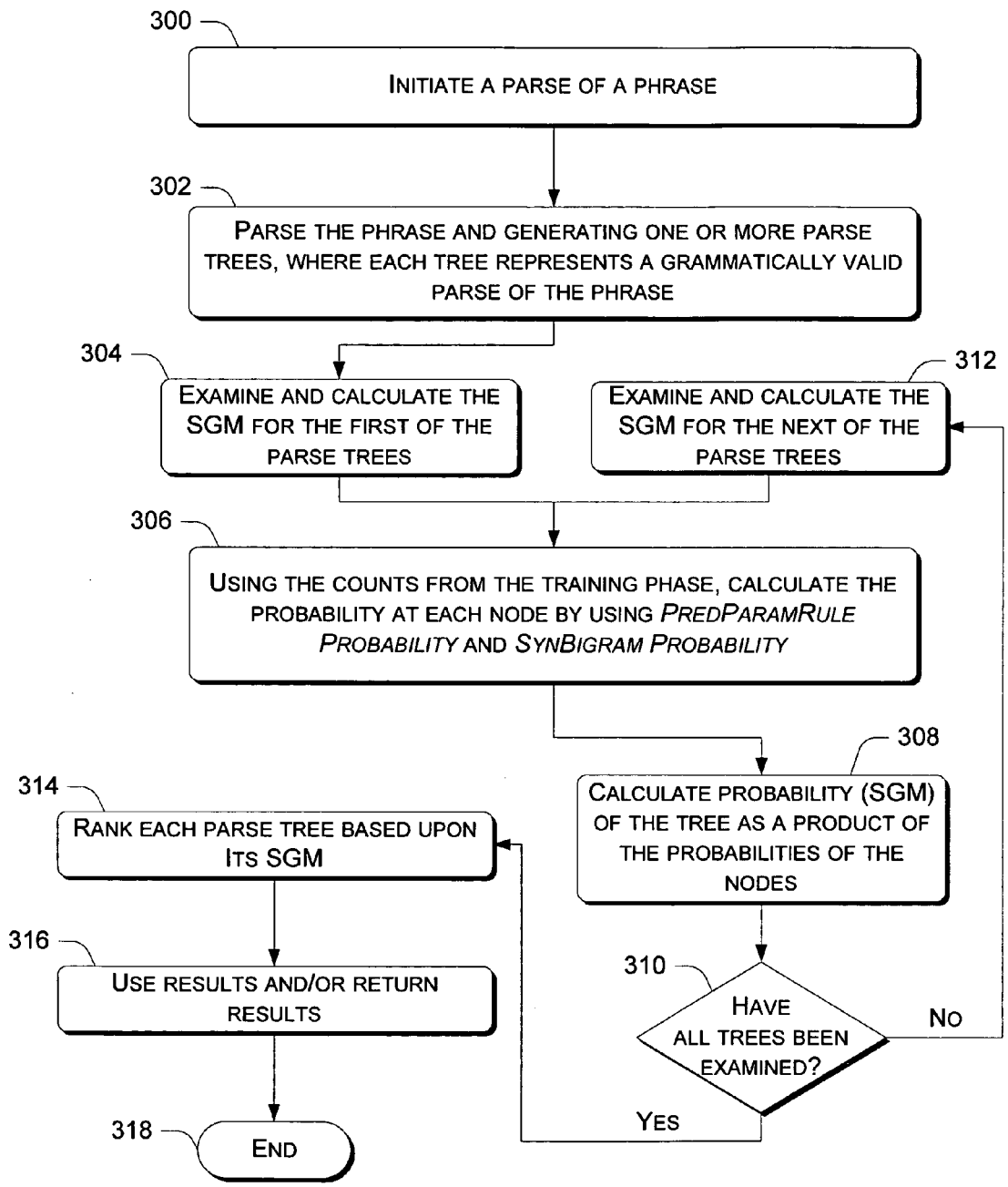
FIG. 11 is a flowchart illustrating the methodology of an implementation of the run-time phase of the exemplary parser.

FIG. 11 shows a methodological implementation of the run-time phase of the exemplary parser. At 300, a parse of a phrase is initiated. An application, such as a grammar checker, may initiate such a parse by the exemplary parser. At 302, the exemplary parser parses the phrase and generates one or more parse trees. Each tree represents a grammatically valid parse of the phrase. If there is only one valid parse, there is no need to rank it for apparent reasons. Thus, this process may jump ahead to blocks 316 to report the results and 318 to end the process.

At 304, the exemplary parser examines and calculates the SGM for the first of the parse trees. The order in which the trees are examined does not affect the results. Therefore, any tree in the set of valid parse trees may be the first. Blocks 306–312 show the details of examinations and SGM calculations for all of the trees of a phrase.

At 306, the exemplary parser calculates the probability at each node in the by using PredParamRule Probability and SynBigram Probability. To do this, the exemplary parser uses the counts from the training phase (described above and shown in FIG. 10).

At 308 in FIG. 11, the exemplary parser calculates probability (i.e., SGM) of the tree as a product of the probabilities of the nodes in the tree. At 310, the process determines if there are more trees to be examined. If so, then the process examines the next tree at 312 and then loops back through blocks 306–310. If all trees of a phrase have been examined, then the exemplary parser ranks each parse tree based upon their SGM at 314.

At 316, the exemplary parser does something with the results. It may store it, report it, return it, display it, or the like. The run-time process ends at 318.

This process may be described by the following exemplary pseudocode:

```
goodness=1;
For each node n in the parse tree
```

$$\text{rule\_prob} = \frac{\text{RuleCountNumerator}(trn(n), hw(n), pl(n), sh(n), segtype(n))}{\text{RuleCountDenominator}(hw(n), pl(n), sh(n), segtype(n))}$$

$$\text{bigram\_prob} = \frac{\text{BigramCountNumerator}(modhw(n), trn(n), hw(n))}{\text{BigramCountDenominator}(trn(n), hw(n))}$$

```
goodness = goodness * rule_prob * bigram_prob;
End loop
```

Alternatives

Computing More Precise Bigrams. Above, Formula 7 was simplified into Formula 8 by removing the syntactic history of $n_X$ (i.e., $sh(n_X)$). This is done because $sh(n_X)$ is not very predicative of what the modifying headword will be. Thus, Formula 7 may be approximated by removing $sh(n_X)$. The result is Formula 8.

This is a reasonable simplification. However, it should be clear to anyone of ordinary skill in the art that this simplification is not necessary. If one keeps $sh(n_X)$ in the formula (as is the case in Formula 7), then the probabilities will be more accurate. However, a larger and more accurate training corpus is necessary.

Making the Training Phase More Efficient. As described, the training phase has two parts: the preparation and the calculation. However, it should be clear to anyone of ordinary skill in the art that the training phase may be accomplished in one part by merging the steps of each part into a single pass over the training corpus.

Word Classes. In general, syntactic bigrams requires a great deal of training data. To make the statistics gathering more tractable, words could be grouped into clusters with similar distributional properties.

One can eat: bananas, apples, pears, peaches, plums, apricots. We could group these all together into a group FRUIT. In the same way, other thing can be grouped together, such as vegetables, fluids, meat, etc. Therefore, instead of dealing with hundreds of words, we can replace them with tens of clusters.

Other alternatives include storing probabilities instead of counts and clustering headwords.

Exemplary Computing Environment

FIG. 12 illustrates an example of a suitable computing environment 920 on which the exemplary ranking parser may be implemented. The exemplary computing environment 920 may be a computing environment comprising or utilizing a NLP system.

Exemplary computing environment 920 is only one example of a suitable computing environment and is not intended to suggest any limitation as to the scope of use or functionality of the invention. Neither should the computing environment 920 be interpreted as having any dependency or requirement relating to any one or combination of components illustrated in the exemplary computing environment 920.

The exemplary ranking parser is operational with numerous other general purpose or special purpose computing system environments or configurations. Examples of well known computing systems, environments, and/or configurations that may be suitable for use with the exemplary ranking parser include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary ranking parser may be described in the general context of computer-executable instructions, such as program modules, being executed by a computer. Generally, program modules include routines, programs, objects, components, data structures, etc. that perform particular tasks or implement particular abstract data types. The exemplary ranking parser may also be practiced in distributed computing environments where tasks are performed by remote processing devices that are linked through a communications network. In a distributed computing environment, program modules may be located in both local and remote computer storage media including memory storage devices.

As shown in FIG. 12, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932.

Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 930 typically includes a variety of computer readable media. Such media may be any available media that is accessible by computer 930, and it includes both volatile and non-volatile media, removable and non-removable media.

In FIG. 12, the system memory includes computer readable media in the form of volatile, such as random access memory (RAM) 940, and/or non-volatile memory, such as read only memory (ROM) 938. A basic input/output system (BIOS) 942, containing the basic routines that help to transfer information between elements within computer 930, such as during start-up, is stored in ROM 938. RAM 940 typically contains data and/or program modules that are immediately accessible to and/or presently be operated on by processor 932.

Computer 930 may further include other removable/non-removable, volatile/non-volatile computer storage media. By way of example only, FIG. 12 illustrates a hard disk drive 944 for reading from and writing to a non-removable, non-volatile magnetic media (not shown and typically called a "hard drive"), a magnetic disk drive 946 for reading from and writing to a removable, non-volatile magnetic disk 948 (e.g., a "floppy disk"), and an optical disk drive 950 for reading from or writing to a removable, non-volatile optical disk 952 such as a CD-ROM, DVD-ROM or other optical media. The hard disk drive 944, magnetic disk drive 946, and optical disk drive 950 are each connected to bus 936 by one or more interfaces 954.

The drives and their associated computer-readable media provide nonvolatile storage of computer readable instructions, data structures, program modules, and other data for computer 930. Although the exemplary environment described herein employs a hard disk, a removable magnetic disk 948 and a removable optical disk 952, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 948, optical disk 952, ROM 938, or RAM 940, including, by way of example, and not limitation, an operating system 958, one or more application programs 960, other program modules 962, and program data 964.

A user may enter commands and information into computer 930 through input devices such as keyboard 966 and pointing device 968 (such as a "mouse"). Other input devices (not shown) may include a microphone, joystick, game pad, satellite dish, serial port, scanner, or the like. These and other input devices are connected to the processing unit 932 through an user input interface 970 that is coupled to bus 936, but may be connected by other interface and bus structures, such as a parallel port, game port, or a universal serial bus (USB).

A monitor 972 or other type of display device is also connected to bus 936 via an interface, such as a video adapter 974. In addition to the monitor, personal computers typically include other peripheral output devices (not shown), such as speakers and printers, which may be connected through output peripheral interface 975.

Computer 930 may operate in a networked environment using logical connections to one or more remote computers, such as a remote computer 982. Remote computer 982 may include many or all of the elements and features described herein relative to computer 930.

Logical connections shown in FIG. 12 are a local area network (LAN) 977 and a general wide area network (WAN) 979. Such networking environments are commonplace in offices, enterprise-wide computer networks, intranets, and the Internet.

When used in a LAN networking environment, the computer 930 is connected to LAN 977 network interface or adapter 986. When used in a WAN networking environment, the computer typically includes a modem 978 or other means for establishing communications over the WAN 979. The modem 978, which may be internal or external, may be connected to the system bus 936 via the user input interface 970, or other appropriate mechanism.

Depicted in FIG. 12, is a specific implementation of a WAN via the Internet. Over the Internet, computer 930 typically includes a modem 978 or other means for establishing communications over the Internet 980. Modem 978, which may be internal or external, is connected to bus 936 via interface 970.

In a networked environment, program modules depicted relative to the personal computer 930, or portions thereof, may be stored in a remote memory storage device. By way of example, and not limitation, FIG. 12 illustrates remote application programs 989 as residing on a memory device of remote computer 982. It will be appreciated that the network connections shown and described are exemplary and other means of establishing a communications link between the computers may be used.

Exemplary Operating Environment

FIGS. 1 and 12 illustrate examples of a suitable operating environments 920 in FIG. 1 and 930 in FIG. 12) in which the exemplary ranking parser may be implemented. Specifically, the exemplary ranking parser is implemented by the parse ranker 34 in FIG. 1 and by any program 960–962 or operating system 958 in FIG. 12.

The operating environments are only examples of suitable operating environments and are not intended to suggest any limitation as to the scope of use of functionality of the ranking parser described herein. Other well known computing systems, environments, and/or configurations that may be suitable for use with the ranking parser include, but are not limited to, personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

Computer-Executable Instructions

An implementation of the exemplary ranking parser may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of the exemplary ranking parser may be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer (particularly a computer implementing a NLP system).

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the ranking parser for NLP has been described in language specific to structural features and/or methodological steps, it is to be understood that the ranking parser defined in the appended claims is not necessarily limited to the specific features or steps described. Rather, the specific features and steps are disclosed as preferred forms of implementing the claimed ranking parser.

The invention claimed is:

1. A method of determining language usage probabilities of a natural language based upon a training corpus, the method comprising:
examining a training corpus, wherein such corpus includes phrases parsed in accordance with a set of grammar rules;
computing probabilities of usage of combinations of linguistic features based upon empirical tracking of appearances of instances of such combinations in phrases within the training corpus;
wherein the combinations of linguistic features consist of:
(transition, headword, phrase level, syntactic history, segtype);
(headword, phrase level, syntactic history, segtype);
(modifying headword, transition, headword); or
(transition, headword).

2. A method as recited in claim 1, wherein the computing comprises counting appearances of instances of combinations of linguistic features within the training corpus.

3. A computer-readable storage medium having computer-executable instructions that, when executed by a computer, performs the method as recited in claim 1.

4. A method for determining a probability at a node in a parse tree, the method comprising:
receiving language-usage probabilities based upon appearances of instances of combinations of linguistic features within a training corpus;
calculating the probability at the node based upon linguistic features of the node and the language-usage probabilities;
wherein the combinations of linguistic features consist of:
(transition, headword, phrase level, syntactic history, segtype);
(headword, phrase level, syntactic history, segtype);
(modifying headword, transition, headword); or
(transition, headword).

5. A method as recited in claim 4, wherein the calculating comprises using PredParamRule Probability formula to calculate the probability at the node.

6. A method as recited in claim 4, wherein the calculating comprises using both PredParamRule Probability and SynBigram Probability formulas to calculate the probability at the node.

7. A computer-readable storage medium having computer-executable instructions that, when executed by a computer, performs the method as recited in claim 4.

8. A method for determining a statistical goodness measure (SGM) of a parse tree representing a parse of a phrase, the parse tree comprising one or more nodes, the method comprising calculating a statistical product of probabilities of each node in the parse tree, wherein the calculating comprises:
receiving language-usage probabilities based upon appearances of instances of combinations of linguistic features within a training corpus;
calculating the probability at the node based upon linguistic features of the node and the language-usage probabilities.

9. A computer-readable storage medium having computer-executable instructions that, when executed by a computer, performs the method as recited in claim 8.

10. A method for determining a statistical goodness measure (SGM) of a parse tree representing a parse of a phrase, the parse tree comprising one or more nodes, the method comprising:
combining probabilities of each node in the parse tree, wherein the probabilities of each node are determined by the steps comprising:
receiving language-usage probabilities based upon appearances of instances of combinations of linguistic features within a training corpus;
calculating the probabilities of each node based upon linguistic features of each node and the language-usage probabilities;
wherein the combinations of linguistic features comprises:
(transition, headword, phrase level, syntactic history, segtype);
(headword, phrase level, syntactic history, segtype);
(modifying headword, transition, headword); and
(transition, headword).

11. A method as recited in claim 10, wherein the calculating comprises using PredParamRule Probability formula to calculate the probability at the node.

12. A method as recited in claim 10, wherein the calculating comprises using both PredParamRule Probability and SynBigram Probability formulas to calculate the probability at the node.

13. A method for ranking multiple parse trees, each tree representing a syntactically valid parse of a phase, the method comprising:
determining statistical goodness measures (SGMs) of each parse tree by the method as recited in claim 10 to get an SGM values associated with each tree;
organizing the trees in order of each tree's associated SGM value.

14. A computer-readable storage medium having computer-executable instructions that, when executed by a computer, performs the method as recited in claim 10.

15. A method for determining a statistical goodness measure (SGM) of a parse tree representing a parse of a phrase, the parse tree comprising one or more nodes, the method comprising:
combining probabilities of each node in the parse tree, wherein the probabilities of each node are determined by the steps comprising:
receiving language-usage probabilities based upon appearances of instances of combinations of linguistic features within a training corpus;
calculating the probabilities of each node based upon linguistic features of each node and the language-usage probabilities;
wherein during the combining, the probabilities of each node in the parse tree are combined in a top-down, generative approach.

16. A method for determining statistical goodness measures (SGMs) of multiple parse trees, each tree representing a syntactically valid parse of a phrase, the method comprising determining a SGM of each parse tree representing a parse of a phrase, the parse tree comprising one or more nodes, the determining comprising:
combining probabilities of each node in the parse tree, wherein the probabilities of each node are determined by the steps comprising:
receiving language-usage probabilities based upon appearances of instances of combinations of linguistic features within a training corpus;
calculating the probabilities of each node based upon linguistic features of each node and the language-usage probabilities.

17. A computer-readable storage medium having computer-executable instructions that, when executed by a computer, perform a method to determine a statistical goodness measure (SGM) of a parse tree representing a parse of a phrase, the parse tree comprising one or more nodes, the method comprising:
combining probabilities of each node in the parse tree, wherein the probabilities of each node are determined by the steps comprising:
receiving language-usage probabilities based upon appearances of instances of combinations of linguistic features within a training corpus;
calculating the probabilities of each node based upon linguistic features of each node and the language-usage probabilities.

18. An apparatus comprising:
a processor;
a natural-language-usage probability determiner executable on the processor to:
examine a training corpus, wherein such corpus includes phrases parsed in accordance with a set of grammar rules;
compute probabilities of usage of combinations of linguistic features based upon empirical tracking of appearances of instances of such combinations in phases within the training corpus;
wherein the combinations of linguistic features consist of:
(transition, headword, phase level, syntactic history, segtype);
(headword, phase level, syntactic history, segtype);
(modifying headword, transition, headword); or (transition, headword).

19. An apparatus comprising:
a processor;
a natural-language-usage probability determiner executable on the processor to:
receive language-usage probabilities based upon appearances of instances of combinations of linguistic features within a training corpus;
calculate a probability at a node in a parse tree based upon linguistic features of the node and the language-usage probabilities,
wherein the combinations of linguistic features consist of (transition, headword, phrase level, syntactic history, segtype);
(headword, phrase level, syntactic history, segtype);
(modifying headword, transition, headword); or
(transition, headword).

20. An apparatus as recited in claim 19, wherein the determiner calculates the probability at the node by using PredParamRule Probability formula.

21. An apparatus as recited in claim 19, wherein the determiner calculates the probability at the node by using both PredParamRule Probability and SynBigram Probability formulas.

22. A data structure for use with a computer having a processor and a memory, said structure comprising:
a corpus comprising one or more phrases in a natural language;
parse trees having hierarchical nodes, each tree representing at least one syntactically valid parse of each phase in a subset of the corpus;
wherein each node as an associated probability, wherein the associated probability of a node is based upon linguistic features of such node and language-usage probabilities derived from appearances of instances of combinations of linguistic features within a training corpus;

wherein PredParamRule Probability formula is used to calculate a probability associated with a node.

23. A data structure as recited in claim 22, wherein the combinations of linguistic features comprises:

(transition, headword, phrase level, syntactic history, segtype);

(headword, phrase level, syntactic history, segtype);

(modifying headword, transition, headword); and (transition, headword).

24. A data structure as recited in claim 22, wherein both PredParamRule Probability and SynBigram Probability formulas are used to calculate a probability associated with a node.

25. The structure as recited in claim 22, wherein the subset of the corpus includes all phrases in the corpus.

* * * * *